United States Patent
Kato et al.

(10) Patent No.: US 10,997,043 B2
(45) Date of Patent: May 4, 2021

(54) SEMICONDUCTOR DEVICE, SEMICONDUCTOR SYSTEMS AND TEST-CONTROL METHODS FOR EXECUTING FAULT INJECTION TEST ON A PLURALITY OF FAILURE DETECTION MECHANISM

(71) Applicant: RENESAS ELECTRONICS CORPORATION, Tokyo (JP)

(72) Inventors: Kazuo Kato, Tokyo (JP); Hiroshi Morita, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 64 days.

(21) Appl. No.: 16/576,398

(22) Filed: Sep. 19, 2019

(65) Prior Publication Data

US 2020/0142795 A1 May 7, 2020

(30) Foreign Application Priority Data

Nov. 6, 2018 (JP) .............................. JP2018-208768

(51) Int. Cl.
G06F 11/20 (2006.01)
G06F 11/22 (2006.01)
(52) U.S. Cl.
CPC ...... *G06F 11/2025* (2013.01); *G06F 11/2215* (2013.01)
(58) Field of Classification Search
CPC .. G06F 11/2023; G06F 11/2025; G06F 11/22; G06F 11/2215; G06F 11/2221; G06F 11/2226; G06F 11/2231; G06F 11/2236; G06F 11/26; G06F 11/27; G11C 29/12; G11C 29/46; G05B 19/0425; G05B 19/0428; G05B 19/058; G05B 23/0218; G05B 23/0256
See application file for complete search history.

(56) References Cited

U.S. PATENT DOCUMENTS 4,835,459 A * 5/1989 Hamlin ................... G06F 11/22
324/73.1
4,875,209 A * 10/1989 Mathewes, Jr. .. G01R 31/31856
714/703

(Continued)

FOREIGN PATENT DOCUMENTS

JP 2017-151785 A 8/2017

*Primary Examiner* — Gabriel Chu
(74) *Attorney, Agent, or Firm* — McDermott Will & Emery LLP

(57) ABSTRACT

A semiconductor device capable of executing fault injection test on a plurality of failure detection mechanism in a short time is provided. The semiconductor device 1 has a plurality of hierarchical modules and an error control module 100 for controlling errors in the plurality of hierarchical modules. Each hierarchical module has a safety mechanism to detect failures in the functions of the components that make up the hierarchical modules. The error control module 100 includes a status register 120 configured to record data indicative of the status of failure of each hierarchical module, and a fault injection function 110 that outputs an error signal to the status register 120 to perform fault injection test. The error signal is inputted into the safety mechanism via the status register 120.

16 Claims, 22 Drawing Sheets

(56) References Cited

U.S. PATENT DOCUMENTS

| | | | |
|---|---|---|---|
| 5,058,112 A * | 10/1991 | Namitz | G06F 11/2215 714/703 |
| 5,617,429 A * | 4/1997 | Goto | G06F 11/0745 714/736 |
| 2007/0174679 A1* | 7/2007 | Chelstrom | G06F 11/2236 714/6.13 |
| 2008/0222457 A1* | 9/2008 | Ertel | G06F 11/3672 714/47.1 |
| 2009/0228748 A1* | 9/2009 | Hagerott | G06F 11/2215 714/718 |
| 2009/0249148 A1* | 10/2009 | Ito | G06F 11/1008 714/746 |
| 2011/0161747 A1* | 6/2011 | Yamazaki | G06F 11/2215 714/705 |
| 2017/0249224 A1 | 8/2017 | Suzuki et al. | |

\* cited by examiner

FIG. 9

| BIT | 15 | 14 | 13 | 12 | 11 | 10 | 9 | 8 |
|---|---|---|---|---|---|---|---|---|
| | ERR15 | ERR14 | ERR13 | ERR12 | ERR11 | ERR10 | ERR9 | ERR8 |
| | R/W | R/W | R/W | R/W | R/W | R/W | R/W | R/W |

| BIT | 7 | 6 | 5 | 4 | 3 | 2 | 1 | 0 |
|---|---|---|---|---|---|---|---|---|
| | ERR7 | ERR6 | ERR5 | ERR4 | ERR3 | ERR2 | ERR1 | ERR0 |
| | R/W | R/W | R/W | R/W | R/W | R/W | R/W | R/W |

120

| BIT | SYMBOL | INITIAL VALUE | R/W | EXPLANATION |
|---|---|---|---|---|
| 15-0 | ERR | 0 | R/W | (NORMAL MODE)<br>0: AN ERROR NOTIFICATION SIGNAL IS NOT OUTPUT FROM THE SAFETY MECHANISM<br>1: AN ERROR NOTIFICATION SIGNAL IS NOT OUTPUT FROM THE SAFETY MECHANISM<br>(FAULT INJECTION MODE)<br>0: FAULT INFECTION IS NOT SET<br>1: FAULT INJECTION HAS BEEN SET |

SEMICONDUCTOR DEVICE, SEMICONDUCTOR SYSTEMS AND TEST-CONTROL METHODS FOR EXECUTING FAULT INJECTION TEST ON A PLURALITY OF FAILURE DETECTION MECHANISM

CROSS-REFERENCE TO RELATED APPLICATIONS

The disclosure of Japanese Patent Application No. 2018-208768 filed on Nov. 6, 2018 including the specification, drawings and abstract is incorporated herein by reference in its entirety.

BACKGROUND

The present disclosure relates to semiconductor device, semiconductor systems, and test-control method.

The Background of the Invention

In a system requiring high reliability, a mechanism called functional safety is applied. In a system to which functional safety (specifically, fail-safe function) is applied, for example, even when an error occurs inside the system, by executing various safety operations according to the type of error or the like, a situation in which a serious problem occurs can be avoided. In order to ensure that such functional safety works normally, it is necessary to perform a test such as injecting an error into the system and checking the operation thereafter.

In connection with such a technique, Japanese unexamined Patent Application publication No. 2017/151785 discloses a semiconductor device for easily generating pseudo-errors therein. The semiconductor device according to the Japanese unexamined Patent Application publication No. 2017/151785 comprises a single semiconductor chip and includes an error detection circuit, an error injection circuit, an error register, and a selection circuit. The error detection circuitry detects an error occurring in the semiconductor device and outputs a first error signal resulting from the detection. The error injection circuit outputs a predetermined second error signal at a predetermined time. The selection circuit selects either the output of the error detector or the output of the error injection circuit in response to the mode signal, and determines the selected output as the output of the error register.

SUMMARY

It is desired to appropriately detect a failure of a failure detection mechanism (circuit) such as an error detection circuit and a failure of a transmission path between the failure detection mechanism and an error processing circuit which performs processing in accordance with a detection result of an error detected by the failure detection mechanism (hereinafter, these are collectively referred to as "failure of failure detection mechanism"). On the other hand, in the art according to the Japanese unexamined Patent Application publication No. 2017/151785, a predetermined second error signal is injected into the selection circuit from the error injection circuit. In such a configuration, the failure of the failure detection mechanism may not be properly detected. When a large number of error detection circuits are provided, the test time may become enormous.

Other objects and novel features will become apparent from the description of this specification and the accompanying drawings.

Means of Solving the Problems

According to an embodiment, a semiconductor device has a functionally divided, hierarchical plurality of hierarchical modules and an error control module configured to perform control over errors in the plurality of hierarchical modules, each of the plurality of hierarchical modules having at least one failure detection mechanism configured to detect a failure of the functions of the components comprising the hierarchical module, the error control module having a status register configured to record data indicating the status of failure of each of the plurality of hierarchical modules and at least one error injection function configured to output error signal to the status register to perform the fault injection test, and the error signal output from the error injection function is input via the status register to each of the plurality of hierarchical modules in the semiconductor device.

According to one embodiment, a test method comprises outputting an error signal for executing fault injection test to a status register configured to record data indicating the status of a failure of each of a plurality of hierarchical modules which are divided and layered by function, and outputting the error signal via the status register to at least one failure detection mechanism configured to detect a failure of a function of a component constituting each of the plurality of hierarchical modules.

According to the embodiment, fault injection test can be performed on a plurality of failure detection mechanism in a short time.

BRIEF DESCRIPTION OF THE DRAWINGS

FIG. 9 is a diagram showing the configuration of the status register according to the first embodiment.

DETAILED DESCRIPTION

Figure 1:
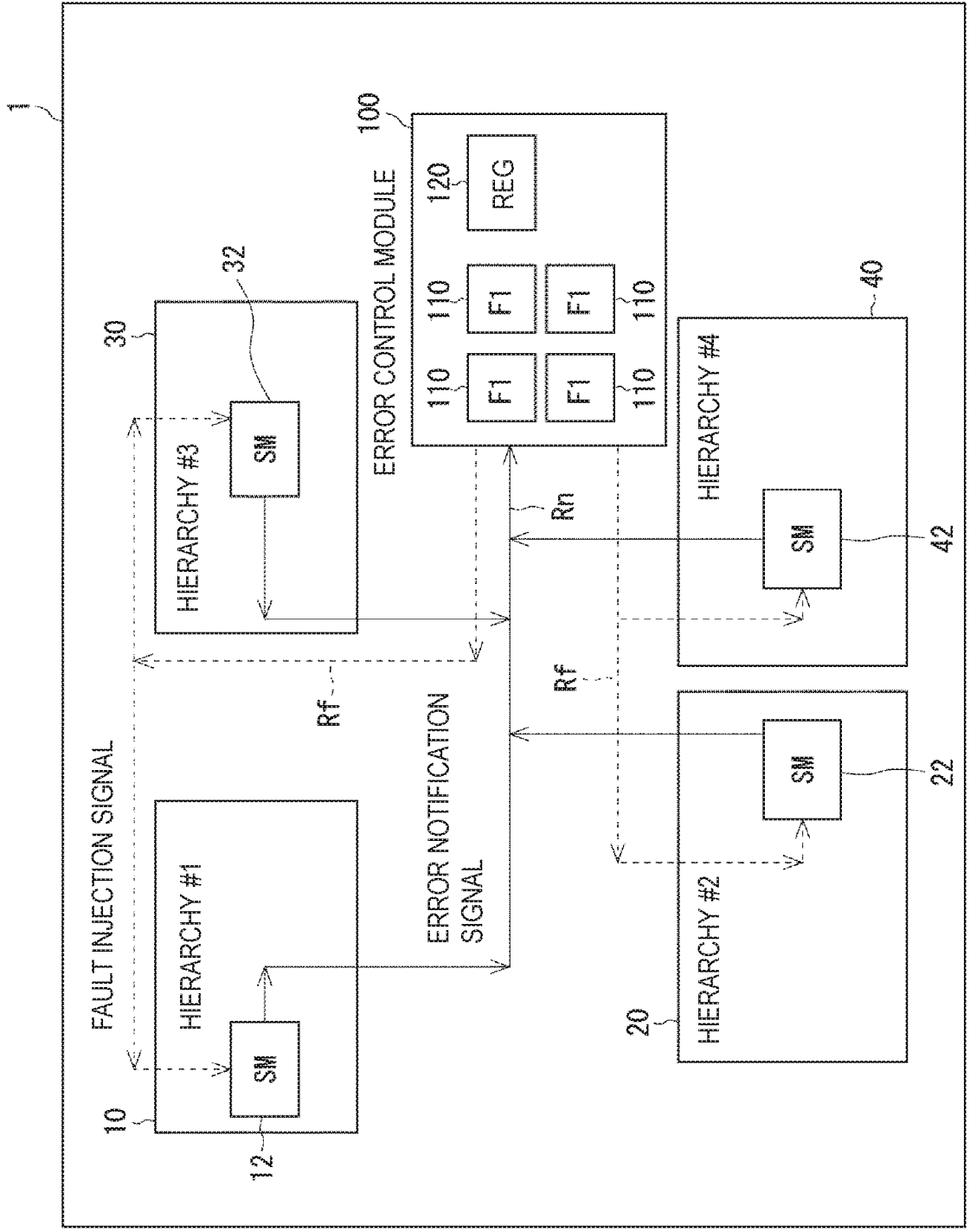
FIG. 1 is an outline of the hardware configuration of the semiconductor device for a first embodiment.

Embodiments will be described below with reference to the drawings. For clarity of explanation, the following description and drawings are appropriately omitted and simplified. In the drawings, the same elements are denoted by the same reference numerals, and a repetitive description thereof is omitted as necessary.

In the following embodiments, when required for convenience, the description will be made by dividing into a plurality of sections or embodiments, but except when specifically stated, they are not independent of each other, and one is related to the modified example, some or all of the other, applications, detailed description, supplementary description, and the like. In addition, in the following embodiments, the number of elements or the like (including the number, number, quantity, range, and the like) is not limited to the specific number except the case where it is specified in particular or the case where it is obviously limited to the specific number in principle, and the number may be equal to or greater than or equal to the specific number, or may be equal to or less than the specific number.

Furthermore, in the following embodiments, the constituent elements (including the operation steps and the like) are not necessarily essential except in the cases where they are specifically specified and the cases where they are considered to be obviously essential in principle. Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above-mentioned numbers and the like, including the number, the numerical value, the amount, the range, and the like.

In addition, the elements described in the drawings as functional blocks for performing various processes can be configured as CPUs (Central Processing Unit), memories, and other circuits in terms of hardware, and are realized by programs loaded into the memories in terms of software. Therefore, it is understood by those skilled in the art that these functional blocks can be realized in various forms by hardware alone, software alone, or a combination thereof, and the present invention is not limited to any of them.

Also, the programs described above may be stored and provided to a computer using various types of non-transitory computer readable media. Non-transitory computer readable media includes various types of tangible storage media. Examples of non-transitory computer-readable media include magnetic recording media (e.g., flexible disks, magnetic tapes, hard disk drives), magneto-optical recording media (e.g., magneto-optical disks), CD-ROM (Read Only Memory, a CD-R, a CD-R/W, solid-state memories (e.g., masked ROM, PROM (Programmable ROM), EPROM (Erasable PROM, flash ROM, RAM (Random Access Memory)). The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

As a system requiring high reliability, for example, there is a fully automatic operation art. In order to realize this fully automated operation art, a technique satisfying the ASIL-D standard among the ISO26262 (functional safety) standards is required. Here, the levels A to D are standardized as ASIL (Automotive Safety Integrity Level: required safety level). Fully automated operating techniques require the certification of the ASIL-D with a normal function random-hardware failure (SPFM, Single Point Failure Metrics) of 99% or more. In addition to clearing the ASIL-B of the reference detection rate (SPFM) of 90% by implementing the safety mechanism (failure detection mechanism, failure detection circuit), a technique for certifying the ASIL-D which clears the problem of the inactive path is desired.

Automatic driving techniques include, for example, cameras input, LADAR (LAser Detection And Ranging) input, LIDAR (LIght Detection And Ranging) input, image processing engine for processing these input signals, and multi-CPU components corresponding to portions of the eye, as exemplified by human functions. SOCs (System On Chip) with these components need to accommodate the scaling up of integrated circuits. Therefore, in the design of SOCs (semiconductor device), hierarchical division layouts are employed as a technique for divisional design in functional units. That is, in highly integrated SOCs for automated operation, since it is difficult to design the layout of one circuit at a time, a method of combining divided layout-designed plurality of hierarchical modules is adopted. When the divided layout is performed, the scan chain used for the start-up BIST (built-in self-test; built-in self-test) is also implemented in units of the divided layout hierarchy, and the start-up BIST is also executed in units of the divided layout hierarchy.

The safety mechanism (SM: Safety Mechanism) implemented to detect a failure of the normal function (the above components) can be verified in the start-up logic BIST tests after the power-on reset. Here, the logic BIST tests are performed on a function-by-function basis. Therefore, the error notification signal outputted by the safety mechanism passes through an untested path between hierarchies, and thus the failure detecting rate may be lowered. As a measure against this problem, fault injection (FI: Fault Injection) tests are implemented in the safety mechanism to activate the route for transmitting an error notification signal. Here, fault injection test is a test in which a failure is inserted into the safety mechanism to cause a pseudo-error intentionally. In present embodiment, the fault injection test is self-test. Details will be described later.

As an example, in an in-vehicle product, it is required that the treatment from turning on the engine key to completion of the boot is completed within a prescribed time required for the vehicle. However, typically more than 1000 components may be implemented in a semiconductor device, so more than 1000 safety mechanisms for checking for these faults may be implemented. Thus, it is not possible to allocate more than 1000 times of fault injection testing after each start-up logic BIST test.

Since the transmission path of the error notification signal outputted by the safety mechanism is also the normal function signaling path, it is required to test any safety mechanism at any time in order to detect a random failure during the SOC operation. Therefore, it is desired to establish a method of testing all safety mechanisms at high speed within a predetermined time defined as FTTI (Fault Tolerant Time Interval). On the other hand, the present embodiment is configured to execute fault injection test on a plurality of failure detection mechanism (circuit) in a short time, as described below.

Next, first embodiment will be described. FIG. 1 is a diagram showing an outline of a hardware configuration of a semiconductor device 1 according to the first embodiment. The semiconductor device 1 of the first embodiment is, for example, SOC. The semiconductor device 1 includes a hierarchy module 10 (hierarchy #1), a hierarchy module 20 (hierarchy #2), a hierarchy module 30 (hierarchy #3), a hierarchy module 40 (hierarchy #4), and an error control module 100 (ECM: Error Control Module). The hierarchical modules 10, 20, 30, and 40 are a plurality of hierarchical modules divided and hierarchized for each function. The error control module 100 is configured to control errors in the plurality of hierarchical modules 10, 20, 30, and 40. The number of the hierarchical modules 10, 20, 30, and 40 is not limited to four.

Each of the hierarchical modules 10, 20, 30, and 40 has at least one safety mechanism 12, 22, 32, and 42, which are failure detection mechanisms (circuits). For example, the hierarchical module 10 may include a plurality of safety mechanisms 12. The safety mechanisms 12, 22, 32, and 42 are configured to detect a functional failure of the components that make up the hierarchical modules 10, 20, 30, and 40, respectively. For example, the safety mechanism 12 is provided for each component (e.g., a CPU (processor)) constituting the hierarchical module 10, and detects (checks) a failure of a corresponding component. The safety mechanisms 12, 22, 32, and 42 are configured by, for example, dual core lock steps (hardware-duplexing), memory ECC (Error check and correct) circuits, or the like. The safety mechanisms 12, 22, 32, and 42 may have the same configuration.

The error control module 100 includes at least one fault injection function 110 (Fault Injection) and a status register 120. The status register 120 is configured to record data indicating the status of the failure of each plurality of hierarchical modules 10, 20, 30, and 40. The error control module 100 is connected to the safety mechanisms 12, 22, 32, and 42 of the hierarchical modules 10, 20, 30, and 40, respectively, via an error notification path Rn (indicated by a thin solid line).

The safety mechanism 12, 22, 32, and 42 outputs an error notification signal indicating that an error has been detected to the error control module 100 via the error notification path Rn. The status register 120 uses the error notification signal to record data indicating statuses for identifying faults detected by the safety mechanisms 12, 22, 32, and 42. For example, if the safety mechanism 12 detects a failure, the status register 120 records an indication that the safety mechanism 12 has detected the failure. Thus, the user can confirm which component of which hierarchical module (hierarchical modules 10, 20, 30, and 40) has failed.

The fault injection function 110 is an error injection function, and is implemented by hardware or software, as will be described later. Preferably, a fault injection function 110 may be provided for each safety mechanism 12, 22, 32, and 42. The fault injection function 110 is configured to output an error signal for executing the fault injection test. The error signal can be injected into the safety mechanisms 12, 22, 32, and 42 to cause intentional faults.

In present embodiment, the error control module 100 is connected to the safety mechanisms 12, 22, 32, and 42 via a feed-back path Rf, shown in thin dashed lines. The error control module 100 uses the feedback path Rf to feed back the error signal output from the fault injection function 110 to the safety mechanisms 12, 22, 32, and 42. At this time, the error signal is injected into the safety mechanisms 12, 22, 32, and 42 via the status register 120. As a result, the safety mechanisms 12, 22, 32, and 42 normally detect an error, so that the error notification path Rn is activated. Then, the error control module 100 detects a failure of the safety mechanisms 12, 22, 32, and 42 in response to comparison of the error notification signal and the error signal transmitted via the error notification path Rn. Details will be described later.

Figure 2:
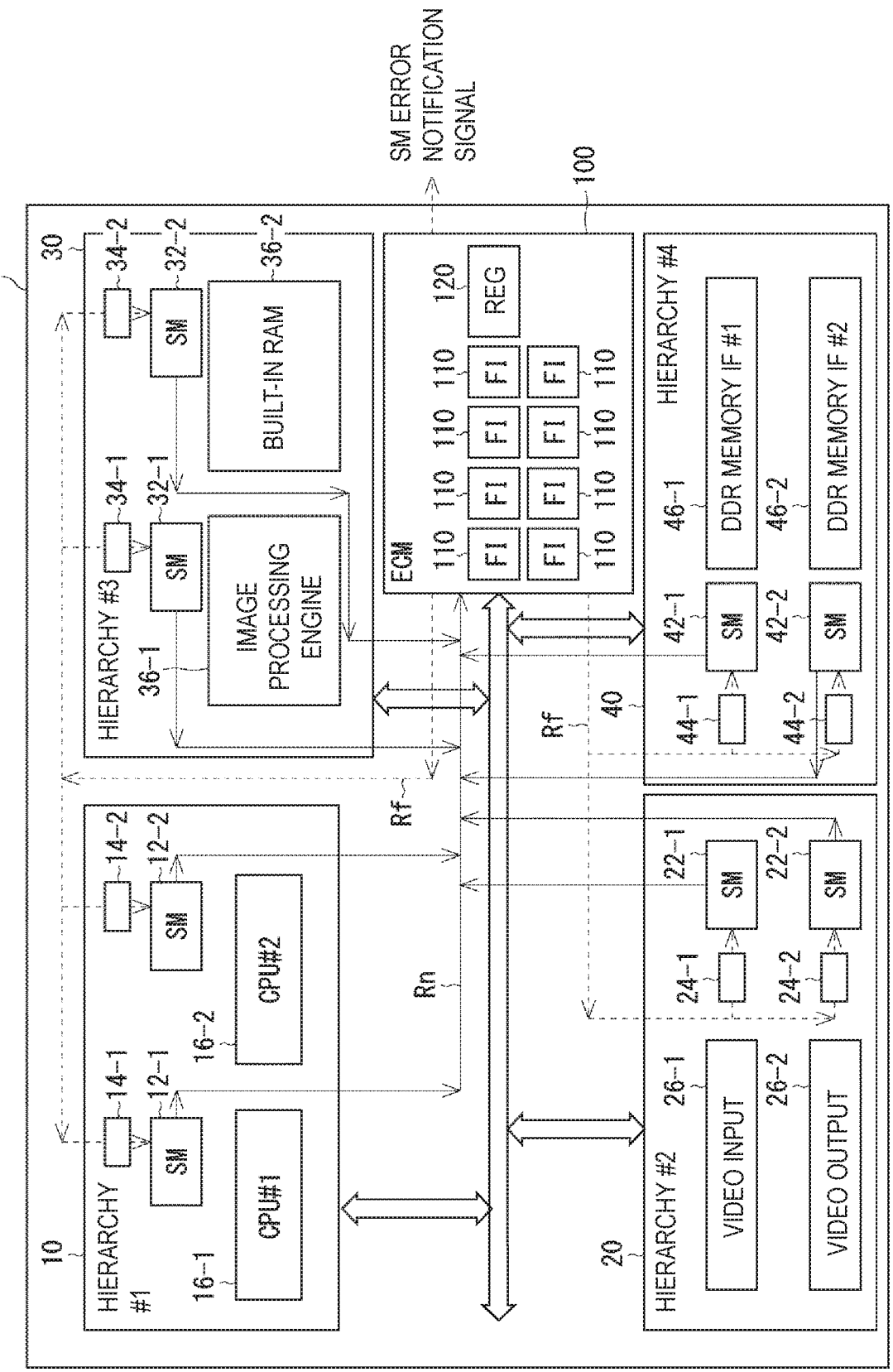
FIG. 2 is a diagram of the details of the hardware configuration of the semiconductor device for first embodiment.

FIG. 2 is a diagram showing in detail the hardware configuration of the semiconductor device 1 according to the first embodiment. The hierarchical module 10 has safety mechanisms 12-1, 12-2, signal monitor circuit 14-1, 14-2, and CPU 16-1, 16-2. The CPU 16-1 (CPU #1) and the CPU 16-2 (CPU #2) are components constituting the hierarchical modules 10. The safety mechanism 12-1 is a failure detection mechanism for detecting a failure of a CPU 16-1. The safety mechanism 12-2 is a failure detection mechanism for detecting a failure of a CPU 16-2. The signal monitor circuit 14-1 and 14-2 monitor the error signals inputted to the safety mechanisms 12-1 and 12-2, respectively. As a result, it is possible to detect a failure (disconnection or the like) of the feedback path Rf connected to the safety mechanisms 12-1 and 12-2. When a plurality of components such as the safety mechanisms 12-1 and 12-2 are not distinguished from each other, they may be collectively referred to as the safety mechanism 12 or the like.

The hierarchical module 20 includes a safety mechanism 22-1, 22-2, a signal monitor circuit 24-1, 24-2, a video input 26-1, and a video output 26-2. The video input 26-1 and the video-output 26-2 are components constituting the hierarchical modules 20. The safety mechanism 22-1 is a failure detection mechanism for detecting a failure of the video input 26-1. The safety mechanism 22-2 is a failure detection mechanism for detecting a failure of the video output 26-2. The signal monitor circuit 24-1 and 24-2 monitor the error signals inputted to the safety mechanisms 22-1 and 22-2, respectively. As a result, it is possible to detect a failure (disconnection or the like) of the feedback path Rf connected to the safety mechanisms 22-1 and 22-2.

The hierarchical module 30 has safety mechanisms 32-1, 32-2, signal monitor circuit 34-1, 34-2, image processing engine 36-1, and built-in RAM 36-2. The image processing engine 36-1 and the built-in RAM 36-2 are components constituting the hierarchical modules 30. The safety mechanism 32-1 is a failure detection mechanism for detecting a failure of the image processing engine 36-1. The safety mechanism 32-2 is a failure detection mechanism for detecting a failure of the built-in RAM 36-2. The signal monitor circuits 34-1 and 34-2 monitor the error signals inputted to the safety mechanisms 32-1 and 32-2, respectively. As a result, it is possible to detect a failure (disconnection or the like) of the feedback path Rf connected to the safety mechanisms 32-1 and 32-2.

The hierarchical module 40 has a safety mechanism 42-1, 42-2, a signal monitor circuit 44-1, 44-2, a DDR memory IF 46-1, 46-2 (Double-Data-Rate memory interface). The DDR memory IF 46-1 and 46-2 are components of the hierarchical module 40. The safety mechanism 42-1 is a failure detection mechanism for detecting a failure of a DDR-memory IF 46-1. The safety mechanism 42-2 is a failure detection mechanism for detecting a failure of a DDR-memory IF 46-2. The signal monitor circuits 44-1 and 44-2 monitor the error signal inputted to the safety mechanisms 42-1 and 42-2, respectively. As a result, it is possible to detect a failure (disconnection or the like) of the feedback path Rf connected to the safety mechanisms 42-1 and 42-2.

As described above, the error control module 100 includes a plurality of fault injection functions 110 and a status register 120. The fault injection function 110 is provided corresponding to the safety mechanisms 12, 22, 32, and 42. Therefore, in the example shown in FIG. 2, the number of safety mechanisms is eight, so there are eight fault injection functions 110. The configurations of the fault injection function 110 and the status register 120 will be described later.

Figure 3:
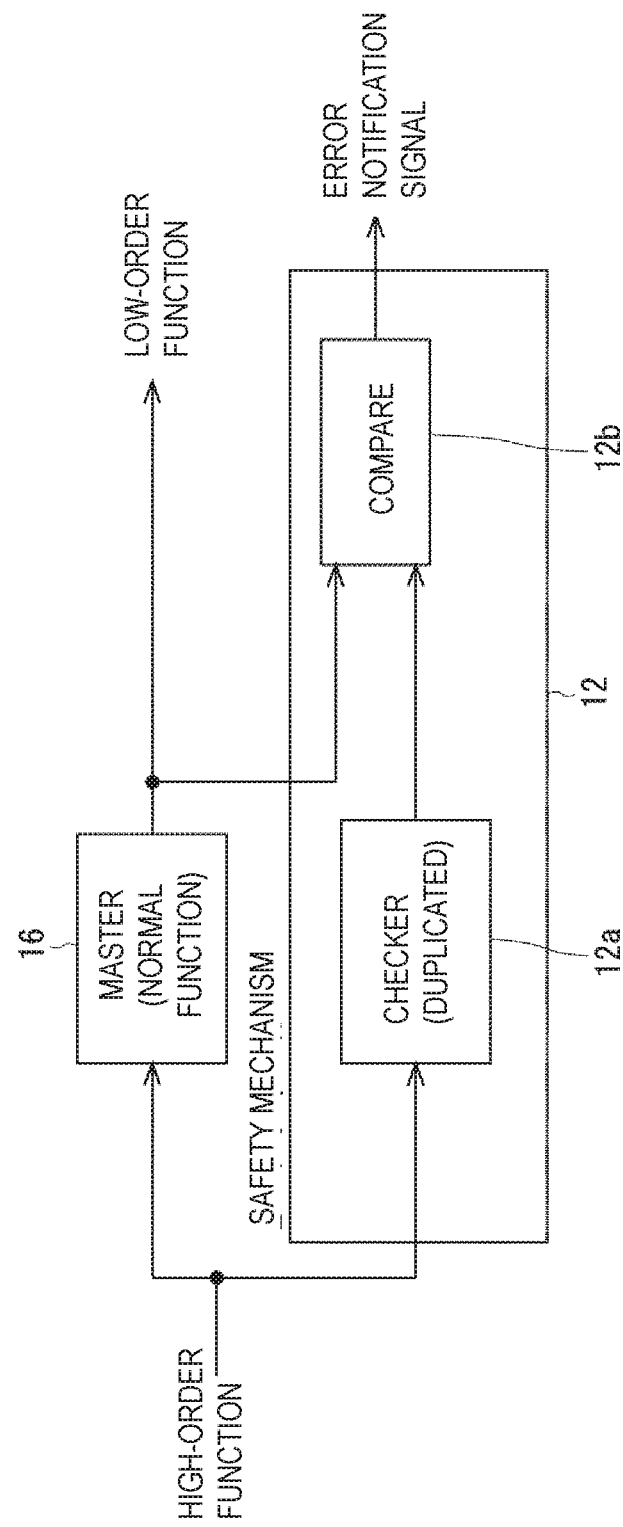
FIG. 3 is a diagram illustrating the structure of a safety mechanism for the first embodiment.

FIG. 3 is a diagram illustrating a configuration of the safety mechanism 12 according to the first embodiment. Although the configuration of the safety mechanism 12 is illustrated in FIG. 3, the configuration of the other safety mechanisms 22, 32, and 42 is the same. The safety mechanism 12 shown in FIG. 3 implements a dual core lockstep function as a safety mechanism for the master circuit of the normal function, in which outputs are multiplexed (duplicated) by a checker circuit equivalent to the master circuit and compared by comparison circuit.

The safety mechanism 12 includes a checker circuit 12a, which is a circuit equivalent to a CPU 16, which is a master circuit (normal function), and a comparison circuit 12b. Buffers such as a register circuit may be provided between the high-order function and the checker circuit 12a and between the CPU 16 (master circuit) and the comparison circuit 12b. The checker 12a executes the same process as the CPU 16. The comparison circuit 12b compares the execution result of the CPU 16 with the execution result of the checker 12a. When the results of the comparisons do not coincide with each other, the comparison circuit 12b outputs an error notification signal indicating that the CPU 16 serving as the master circuit has failed. At the time of fault injection test, an error signal is injected into the checker 12a.

Figure 4:
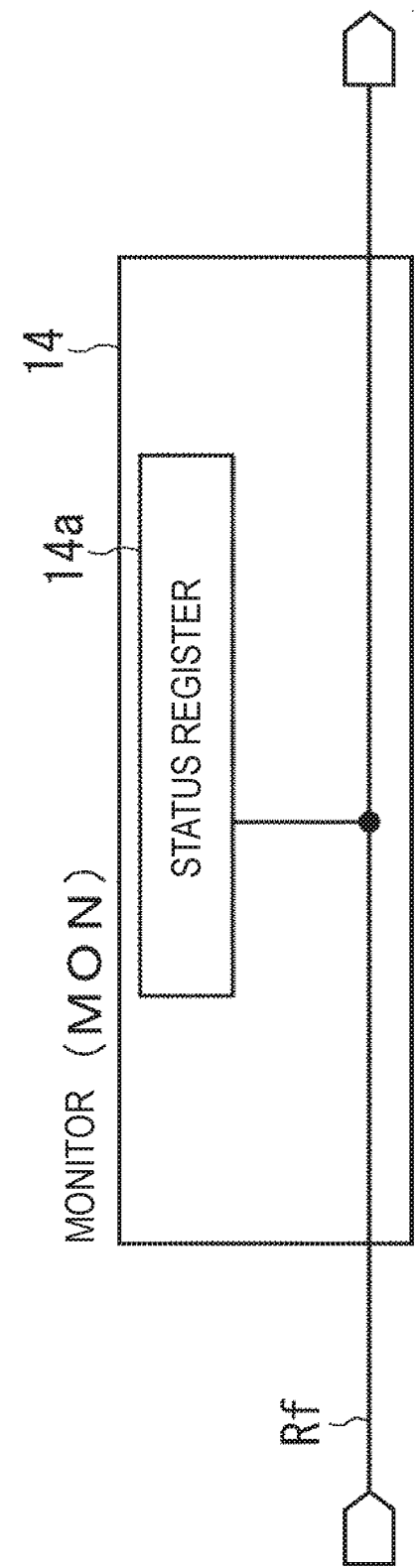
FIG. 4 is a diagram illustrating the configuration of the signal monitor circuit according to the first embodiment.

FIG. 4 is a diagram illustrating a configuration of the signal monitor circuit 14 according to the first embodiment. Although the configuration of the signal monitor circuit 14 is exemplified in FIG. 4, the configuration of the signal monitor circuits 24, 34, and 44 is also the same. The signal monitor circuit 14 has a status register 14a. The status register 14a records the status of the fault injection signal in the feed-back path Rf. The status register 14a sets the data indicating that the fault injection signal is transmitted when the fault injection signal is "1 (asserted)" in the feedback path Rf. The status recorded in the status register 14a can be confirmed by a read from a central processing unit (CPU) (not shown) mounted on the semiconductor device 1. As a result, the error signal inputted to the safety mechanism 12 can be monitored, and therefore, an anomaly in the feedback path Rf can be detected.

Figure 5:
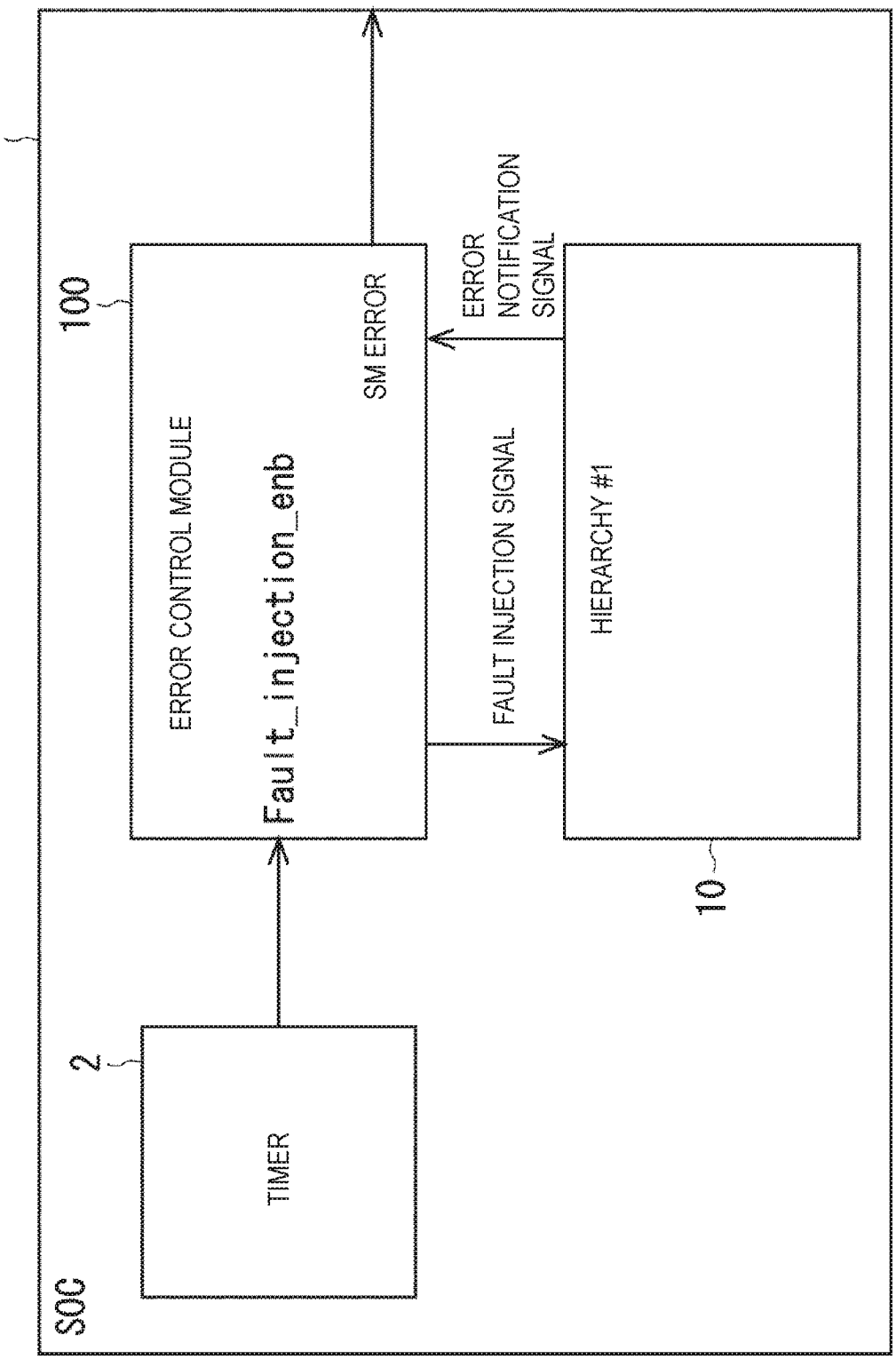
FIG. 5 is a diagram of the configuration of the semiconductor device when the fault injection function for the first embodiment is realized in hardware.
Figure 6:
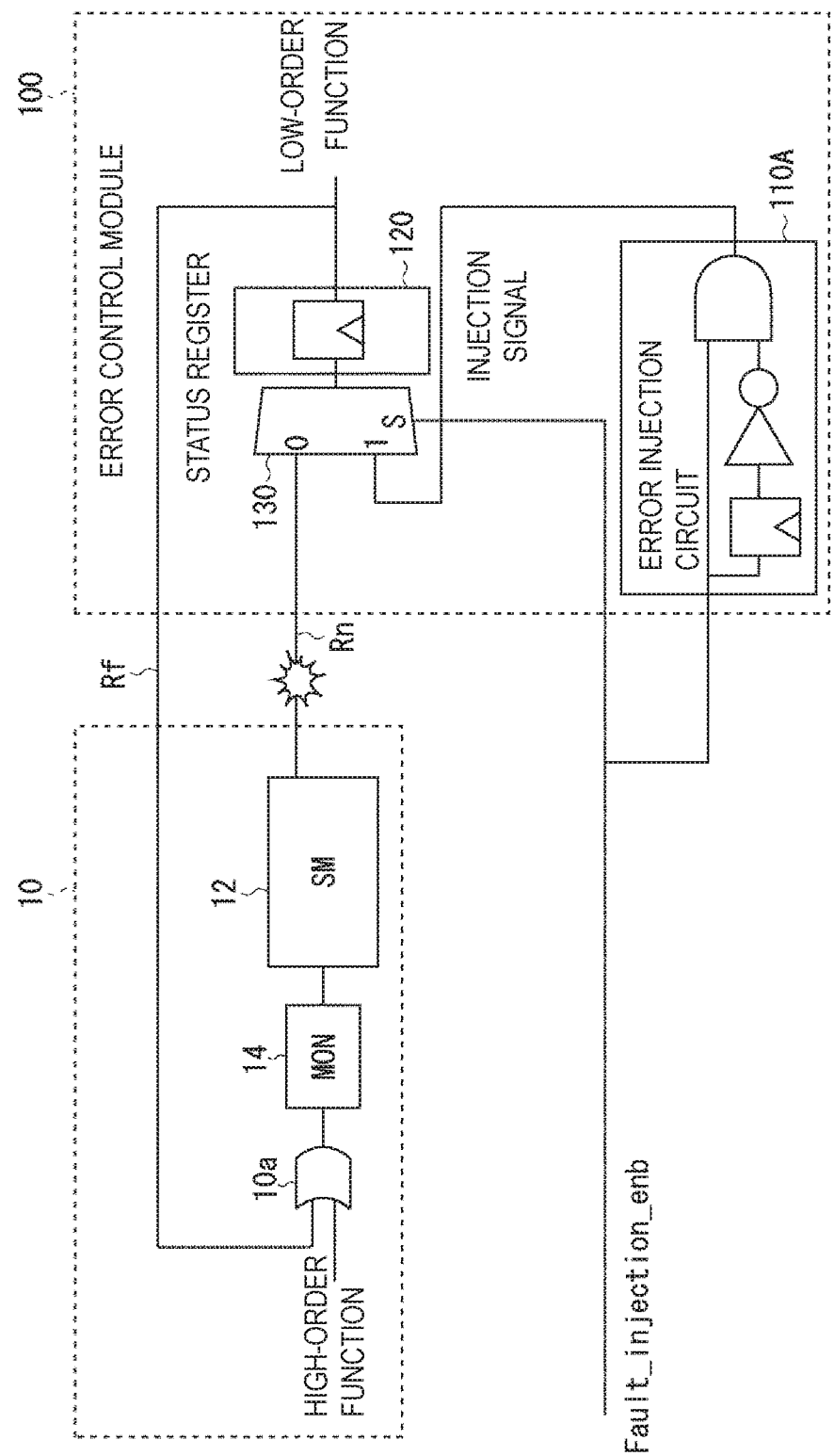
FIG. 6 is a diagram of the configuration of the semiconductor device when the fault injection function for the first embodiment is realized in hardware.

FIGS. 5 and 6 are diagrams showing a configuration of the semiconductor device 1 when the fault injection function 110 according to the first embodiment is realized by hardware. FIG. 5 is a diagram showing a hardware configuration of the semiconductor device 1 when the fault injection function 110 is realized by hardware. FIG. 6 is a diagram showing a configuration of the error control module 100 when the fault injection function 110 is implemented in hardware. The semiconductor device 1 (SOC) includes a timer 2, hierarchical modules, and an error control module 100. In FIG. 5, only the hierarchical module 10 among the hierarchical modules 10, 20, 30, and 40 is shown for clarity of description.

The error control module 100 includes an error injection circuit 110A as a fault injection function 110, a status register 120, and a selection circuit 130. The error injection circuit 110A is a one-shot circuit. The timer 2 asserts the Fault_injection_enb signal, for example, at regular intervals.

If the Fault_injection_enb signal is not asserted, the selection circuit 130 outputs a signal (error notification signal) from the safety mechanism 12 to the status register 120. The status register 120 records data (second data) indicating the error status of the component (function) to be detected by the safety mechanism 12. Then, the status register 120 outputs SM error notification signal indicating that a failure has occurred in the component to the outside (low-order function). This allows the user to confirm which component has failed.

On the other hand, when the Fault_injection_enb signal is asserted, the error injection circuit 110A outputs one-pulse fault injection signal (error signal). Then, the selection circuit 130 outputs the output from the error injection circuit 110A, that is, the fault injection signal of one pulse to the status register 120. As a result, the status register 120 records the first data corresponding to the error signal. The status register 120 then transmits the fault injection signal to the safety mechanism 12 via the feedback path Rf. As a result, the safety mechanism 12 outputs error notification signal, and the error notification path Rn is activated.

Figure 7:
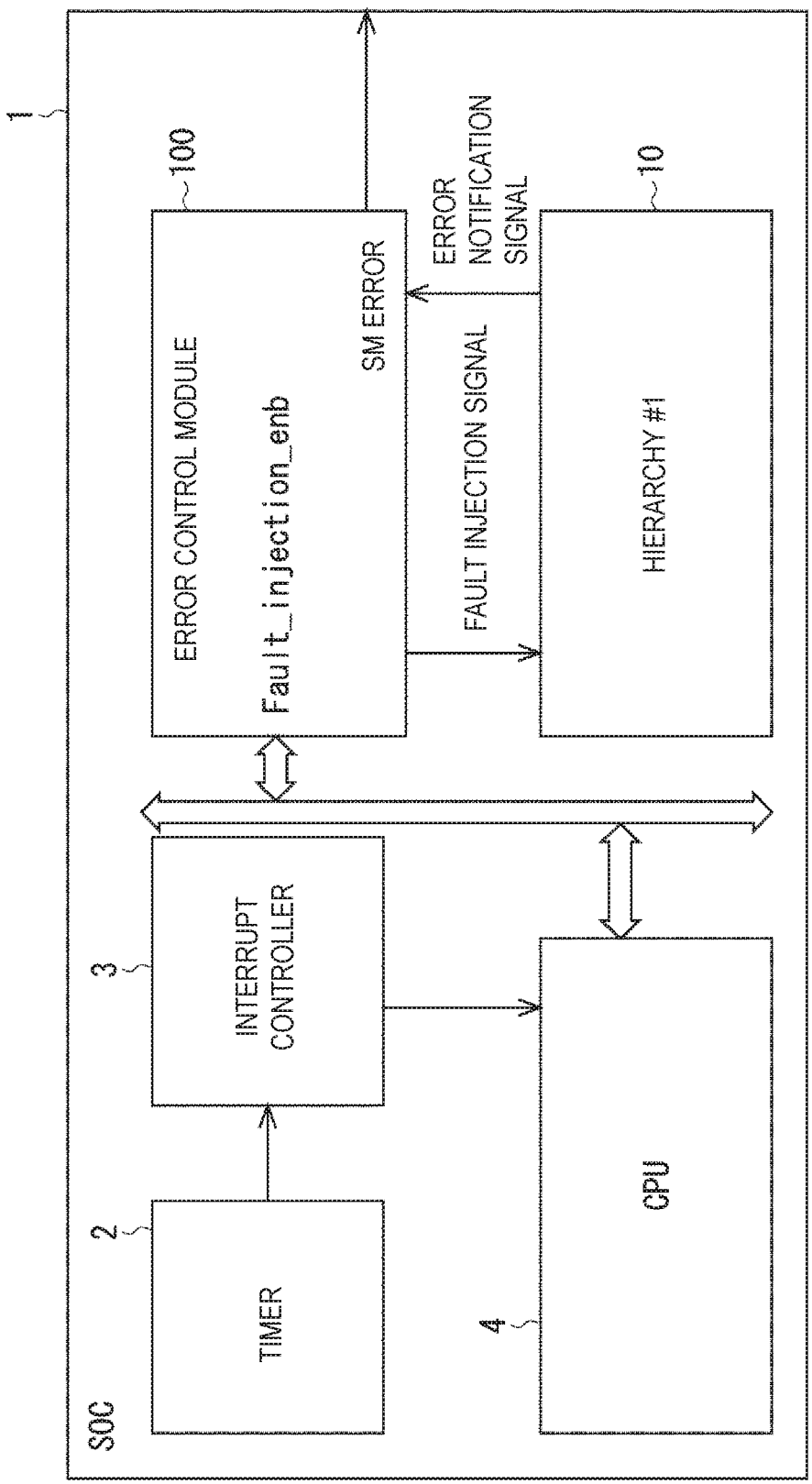
FIG. 7 is a diagram of the configuration of the semiconductor device when software implements the fault injection function for the first embodiment.
Figure 8:
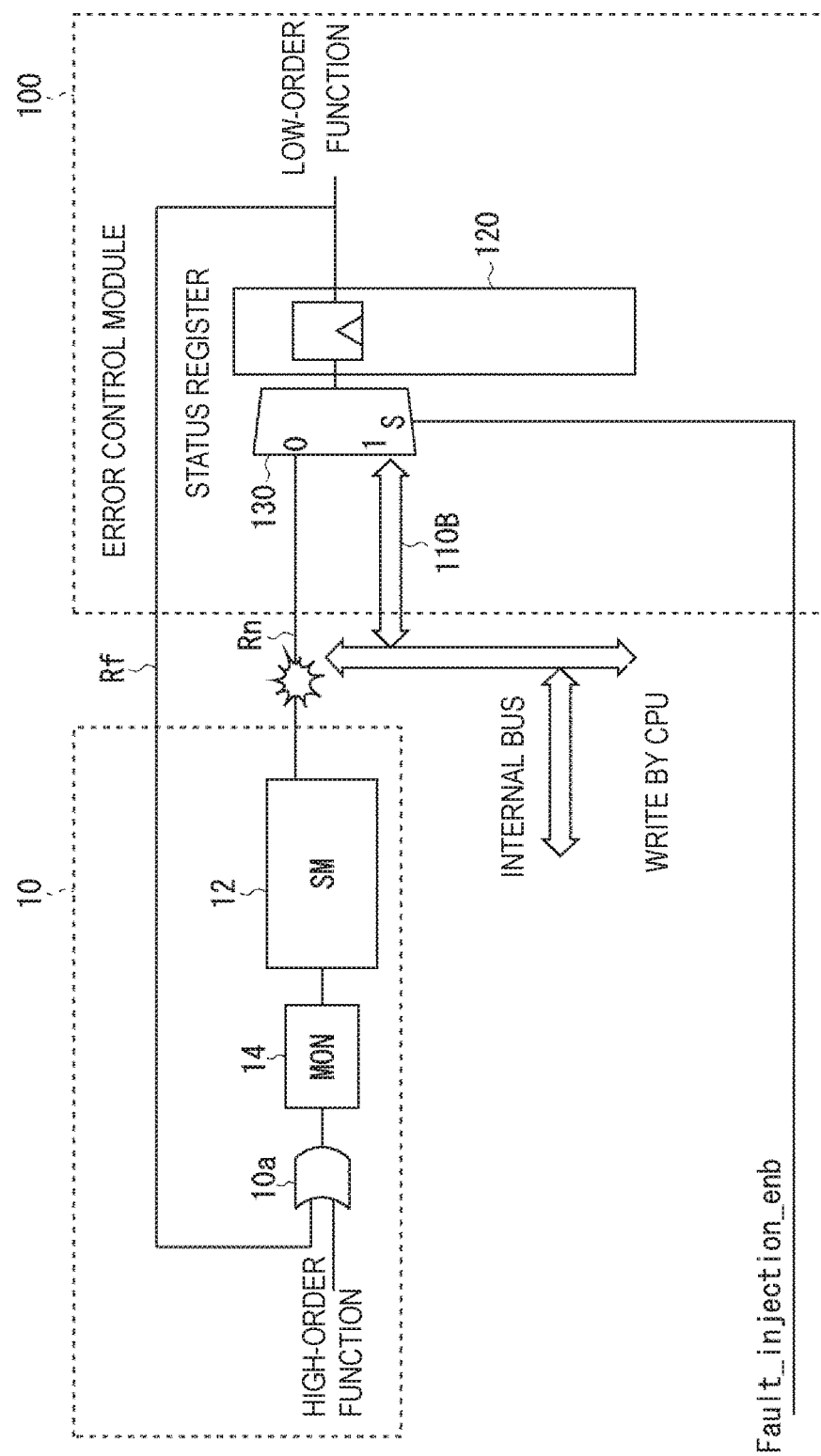
FIG. 8 is a diagram of the configuration of the semiconductor device when software implements the fault injection function for the first embodiment.

FIGS. 7 and 8 are diagrams showing a configuration of the semiconductor device 1 when the fault injection function 110 according to the first embodiment is implemented by software. FIG. 7 is a diagram showing a hardware configuration of the semiconductor device 1 when the fault injection function 110 is implemented by software. FIG. 8 is a diagram showing a configuration of the error control module 100 when the fault injection function 110 is implemented in software. The semiconductor device 1 includes a timer 2, an interrupt controller 3, a CPU 4, hierarchical modules, and an error control module 100. In FIG. 7, only the hierarchical module 10 among the hierarchical modules 10, 20, 30, and 40 is shown for clarity of description.

The error control module 100 includes an error injection path 110B, which is a fault injection function 110, a status register 120, and a selection circuit 130. The error injection path 110B is connected to an internal bus connected to the CPU 4. The Fault_injection_enb signal is asserted by the timer 2, for example, at regular intervals. Thus, the selection circuit 130 selects to output the output from the error injection path 110B to the status register 120.

When the Fault_injection_enb signal is asserted by the timer 2, the interrupt controller 3 generates an interrupt. Thus, the CPU 4 outputs fault injection signal to the selection circuit 130 via the internal bus and error injection path 110B. Accordingly, the selection circuit 130 outputs the fault injection signal to the status register 120. The operation of the status register 120 and the like is the same as the examples shown in FIGS. 5 and 6.

FIG. 9 is a diagram showing a configuration of the status register 120 according to the first embodiment. The status register 120 has at least a number of bits corresponding to the safety mechanism 12, 22, 32, and 42. In the illustration of FIG. 2, since semiconductor device 1 is provided with eight safety mechanisms, status register 120 has eight or more bits. That is, the bits of the status register 120 correspond to the safety mechanisms 12, 22, 32, and 42, respectively. Since the status register 120 shown in FIG. 9 has 16 bits, it can cope with 16 safety mechanisms. Also, depending on the size of the semiconductor device 1, the number of components (safety mechanisms) may be hundreds to thousands, and in this instance, the number of bits of the status register 120 may be hundreds to thousands of bits.

For example, bit #0 (ERR0) of status register 120 may record data indicating errors associated with safety mechanism 12-1. Bit #1 (ERR1) of status register 120 may record data indicating errors associated with safety mechanism 12-2. In addition, the status register 120 is configured to record the status when fault injection test is not performed, that is, when the mode is the normal mode, and the status when fault injection test is performed.

In other words, the status register 120 according to the first embodiment is configured to record the status both in the normal mode and in the fault injection mode. If the Fault_injection_enb signal is not asserted, the status register 120 records data in normal mode, and if the Fault_injection_enb signal is asserted, the status register 120 records data in fault injection mode.

Here, when the fault injection test is not performed, that is, in the normal mode, the respective bits indicate whether or not an error notification signal indicating that a failure has occurred in the corresponding component is outputted from the corresponding safety mechanism 12, 22, 32, and 42. When a bit is "0" in the normal mode, error notification signal is not outputted from the safety mechanism corresponding to the bit. On the other hand, when a certain bit is "1" in the normal mode, error notification signal is outputted from the safety mechanism corresponding to the bit. For example, when the bit #0 (ERR0) is "0" in the normal mode, the safety mechanism 12-1 does not output error notification signal. Therefore, no failure of the CPU 16-1 corresponding to the safety mechanism 12-1 has been detected. When the bit #1 (ERR1) is "1" in the normal mode, the safety mechanism 12-2 outputs error notification signal. Therefore, a failure of the CPU 16-2 corresponding to the safety mechanism 12-2 has been detected.

On the other hand, in the fault injection mode, the respective bits record the fault injection settings (data corresponding to fault injection signal) for the corresponding safety mechanism 12, 22, 32, and 42. In the case of the fault injection mode, when a certain bit is "0", it indicates that the fault injection is not set. In the case of the fault injection mode, when a certain bit is "1", it indicates that the fault injection has been set. When fault injection signal is asserted for a safety mechanism 12, 22, 32, and 42, the bits corresponding to that safety mechanism 12, 22, 32, and 42 are set to "1". Then, as will be described later, when the safety mechanism 12, 22, 32, and 42 fails, the bit corresponding to the safety mechanism 12, 22, 32, and 42 is reset to "0".

In this manner, the status register 120 according to the first embodiment records data (first data) corresponding to fault injection signal (error signal) when fault injection test is performed. Then, when the safety mechanism performs normal operation, the status register 120 records data (second data) indicating the error status of the component (function) whose failure is detected by the safety mechanism. Thus, the status register 120 can be used in both the normal mode and the fault injection mode. Therefore, the quantity of status register can be reduced.

The selection circuit 130 outputs the fault injection signal (error signal) output from the fault injection function 110 to the status register 120 when performing fault injection test. On the other hand, the selection circuit 130 outputs error notification signal (second data) to the status register 120 when fault injection test is not performed. As a result, the status register 120 can be used in both the normal mode and the fault injection mode.

As described above, the status register 120 has at least the number of bits corresponding to the number of safety mechanisms 12, 22, 32, and 42. With this configuration, the bits of the status register 120 can be used efficiently. Assume that a status register is provided for each of the hierarchical modules. Suppose that status register has 16 bits. Assuming that four safety mechanisms, i.e., four components to be detected, are provided for the respective hierarchical modules, only four of the 16 bits are utilized in this status register. Assuming that the same applies to other hierarchical modules, the number of bits that are not utilized is further increased. On the other hand, in the present embodiment, since the status register 120 has at least the number of bits corresponding to the number of safety mechanisms 12, 22, 32, and 42, the statuses of all the safety mechanisms can be collectively recorded. This allows efficient use of the bits of the status register 120. In addition, since one status register 120 collectively records the statuses of all the safety mechanisms in this manner, it is possible to perform fault injection test of many safety mechanisms with a smaller number of register accesses. Therefore, the test can be performed efficiently and quickly.

Figure 10:
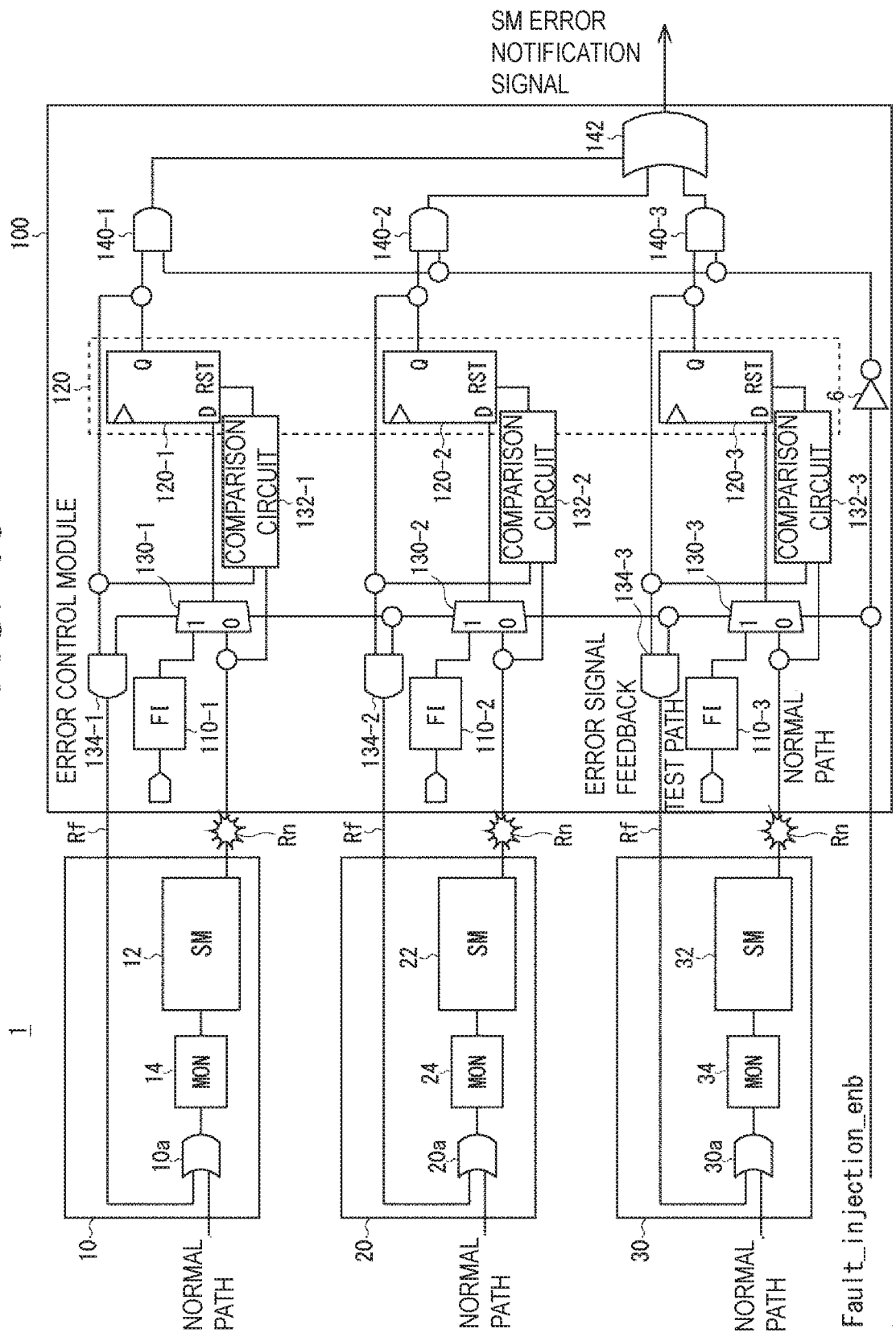
FIG. 10 is a diagram showing the circuit configuration of the error control module for the first embodiment.

FIG. 10 is a diagram showing a circuit configuration of the error control module 100 according to the first embodiment. For clarity of explanation, FIG. 10 shows the hierarchical modules 10, 20, 30 among the hierarchical modules 10, 20, 30, and 40. Each of the hierarchical modules 10, 20, and 30 includes one safety mechanism 12, 22, and 32, respectively. Similarly, each of the hierarchical modules 10, 20, and 30. includes one signal monitor circuit 14, 24, and 34, respectively. Each of the hierarchical modules 10, 20, and 30 has OR circuits 10a, 20a, and 30a, respectively. By the OR-circuits 10a, 20a, and 30a, the signals of the normal path or the feedback-path Rf are transmitted to the safety mechanisms 12, 22, and 32 via the signal monitor circuit 14, 24, and 34, respectively.

The error control module 100 has a fault injection function 110-1, a selection circuit 130-1, a comparison circuit 132-1, an AND circuit 134-1, and an AND circuit 140-1 corresponding to the safety mechanism 12, respectively. The status register 120 also has a status register section 120-1 corresponding to the safety mechanism 12. This status register part 120-1 corresponds to the bits of the status register 120 relating to the safety mechanism 12.

The error control module 100 also includes a fault injection function 110-2, a selection circuit 130-2, a comparison circuit 132-2, an AND circuit 134-2, and an AND circuit 140-2 corresponding to a safety mechanism 22, respectively. The status register 120 also has a status register section 120-2 corresponding to the safety mechanism 22. This status register part 120-2 corresponds to the bits of the status register 120 relating to the safety mechanism 22.

The error control module 100 also includes a fault injection function 110-3, a selection circuit 130-3, a comparison circuit 132-3, an AND circuit 134-3, and an AND circuit 140-3 corresponding to a safety mechanism 32, respectively. The status register 120 also has a status register section 120-3 corresponding to the safety mechanism 32. This status register part 120-3 corresponds to the bits of the status register 120 relating to the safety mechanism 32.

Although the safety mechanism 12 will be described below, the same operation is performed for the safety mechanisms 22 and 32. In the normal mode, the Fault_injection_enb signal is not asserted. In this case, the safety mechanism 12 checks whether or not the component (function) targeted for the failure detection by the safety mechanism 12 has failed. If this component fails, the safety mechanism 12 outputs error notification signal to the selection circuit 130-1 via the error-notification path Rn. The selection circuit 130-1 outputs error notification signal to the status register part 120-1 because the Fault_injection_enb signal is not asserted. The status register part 120-1 records data (second data) indicating an error condition of a component (function) to be detected by the safety mechanism 12. Then, the status register part 120-1 outputs a SM error notification signal indicating that a failure has occurred in the component. At this time, since the signal Fault_injection_enb inputted to the AND circuit 140-1 is inverted by the NOT circuit 6, the SM error notification signal is outputted to the outside (low-order function).

Figure 11:
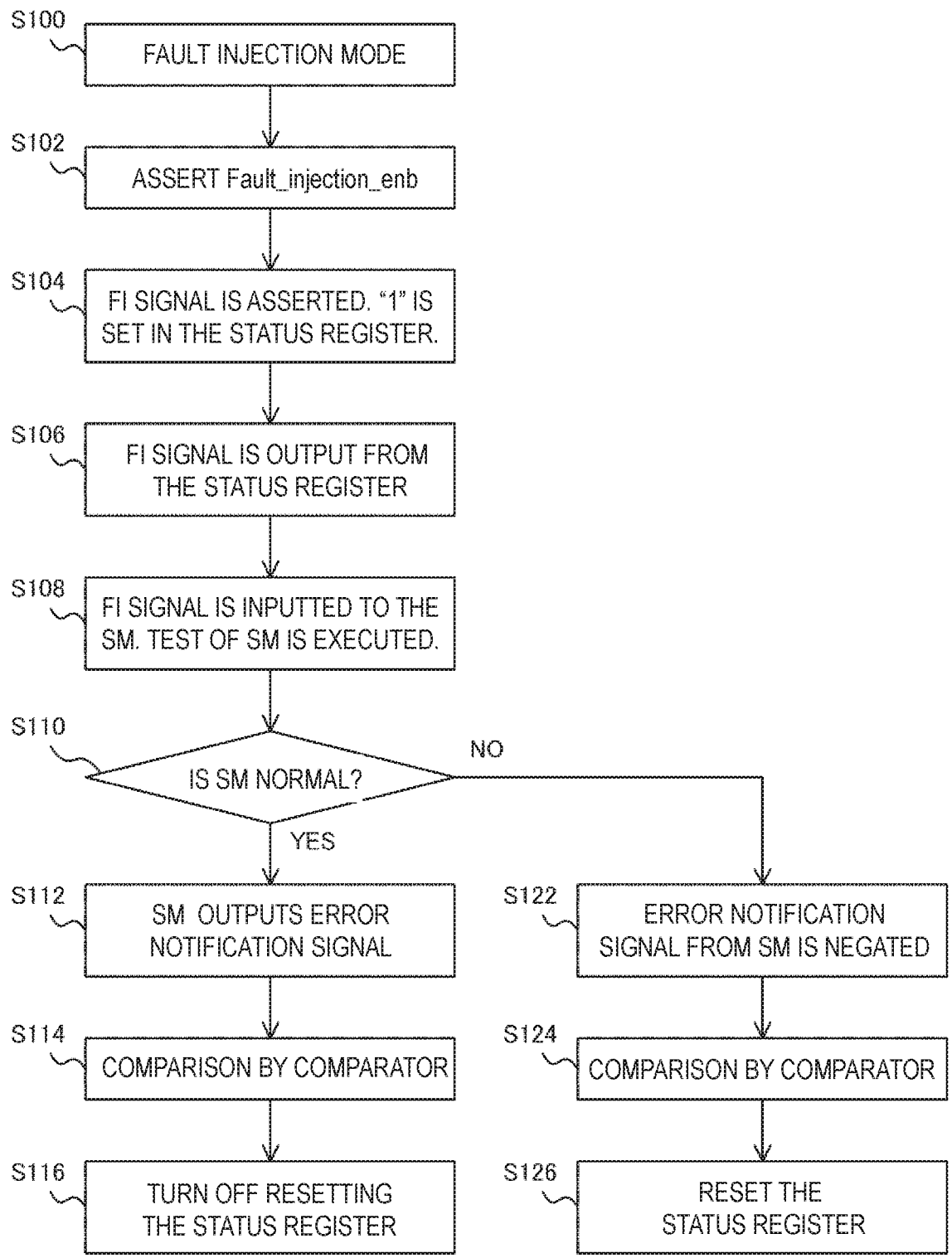
FIG. 11 is a flow chart showing how to test the fault injection test of semiconductor device for the first embodiment.
Figure 12:
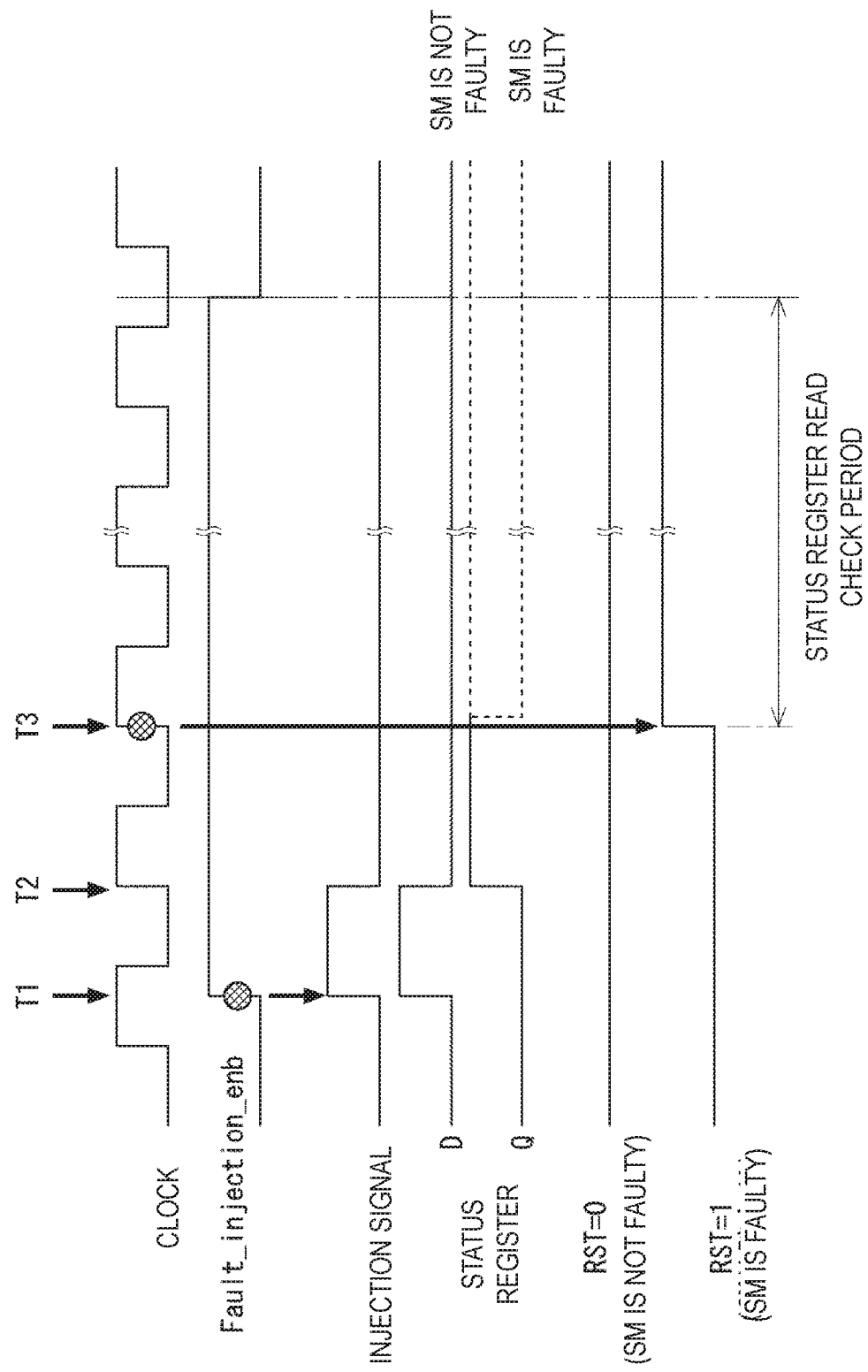
FIG. 12 is a timing chart showing the operation of the semiconductor device on the first embodiment in relation to the fault injection test.

FIG. 11 is a flow chart illustrating a testing process for the fault injection test of semiconductor device 1 according to the first embodiment. FIG. 12 is a timing chart showing the operation related to the fault injection test of the semiconductor device 1 according to the first embodiment. The semiconductor device 1 shifts to the fault injection mode (step S100 in FIG. 11). As a result, the Fault_injection_enb signal is asserted (step S102 in FIG. 11, step T1 in FIG. 12). At this time, the fault injection function 110-1 outputs (asserts) fault injection signal, and the selection circuit 130-1 outputs signals from the fault injection function 110-1. Therefore, "1" is set in the status register part 120-1 (step S104).

At the next clock output timing (T2 in FIG. 12), fault injection signal is output from the status register section 120-1 to the feedback path Rf (step S106). At this time, since the Fault_injection_enb signal is asserted, the AND circuit 134-1 outputs the fault injection signal signal to the hierarchical module 10 via the feedback path Rf. As a result, the fault injection signal is inputted to the safety mechanism 12, and the fault injection test of the safety mechanism 12 is executed in step S108.

If the safety mechanism 12 is normal, i.e., has not failed (YES in step S110), the safety mechanism 12 normally detects an error (pseudo-error) at the timing of the subsequent clock-output (T3 in FIG. 12). Therefore, the safety mechanism 12 outputs the error notification signal to the error control module 100 via the error notification path Rn (step S112).

The comparison circuit 132-1 compares fault injection signal (error signal) in the feedback path Rf with error notification signal in the error notification path Rn (S114). In this instance, since fault injection signal in the feedback path Rf and error notification signal in the error notification path Rn are both asserted, the comparison circuit 132-1 determines that both the feedback path Rf and the error notification path Rn coincide with each other. Therefore, the comparison circuit 132-1 resets the status register part 120-1 to off (RST=0) (step S116). This indicates that the status register 120 setting for the safety mechanism 12 remains "1" and the safety mechanism 12 has not failed.

When the safety mechanism 12 is not normal, i.e., fails (NO in step S110), the safety mechanism 12 cannot detect an error (pseudo error) at the timing of the subsequent clock-output (T3 in FIG. 12). Therefore, since the safety mechanism 12 does not output error notification signal, the error notification signal in the error notification path Rn is negated (step S122). Note that even when the safety mechanism 12 itself does not fail, or when the error notification path Rn is disconnected or the like, the error notification signal in the error notification path Rn becomes negated (S122).

The comparison circuit 132-1 compares fault injection signal (error signal) in the feedback path Rf with error notification signal in the error notification path Rn (S124). In this instance, since only fault injection signal in the feedback path Rf is asserted and error notification signal in the error notification path Rn is negated, the comparison circuit 132-1 determines that both the feedback path Rf and the error notification path Rn do not coincide with each other. Therefore, the comparison circuit 132-1 resets the status register part 120-1 (RST=1) (step S126). This resets the setting of the status register 120 for the safety mechanism 12 to "0" indicating that the safety mechanism 12 has failed. During the status register read check, the CPU (not shown) accesses the status register 120. As a result, it is possible to easily confirm which safety mechanism has failed.

The selection circuits 130-1, 130-2, and 130-3 select to simultaneously output the error signal from the fault injection function 110 when Fault_injection_enb signal is asserted. At this time, the fault injection functions 110-1, 110-2, and 110-3 simultaneously output fault injection signals (error signals). Therefore, the fault injection signal outputted from the fault injection functions 110-1, 110-2, and 110-3 are simultaneously set in the status register 120. The fault injection signals set in the status register 120 are simultaneously outputted to the safety mechanisms. Therefore, the semiconductor device 1 according to the present embodiment can execute the fault injection test collectively for all the safety mechanisms.

Further, the semiconductor device 1 according to the present embodiment is provided with a fault injection function 110 for each of a plurality of safety mechanisms. The feedback path Rf is provided independently for each of the plurality of safety mechanisms. As a result, the fault injection signal (error signal) outputted from the fault injection function 110 is inputted to each safety mechanism of the plurality of hierarchical modules independently of each other. Therefore, not only the fault injection test may be performed simultaneously for all safety mechanisms, but also the fault injection test may be performed at any times for any safety mechanism. Specifically, the timer 2 of the semiconductor device 1 asserts the Fault_injection_enb signal to the fault injection function 110 and the selection circuit 130 relating to the safety mechanism that the fault injection test is desired to be performed at any time. As a result, the fault injection test is executed for any safety mechanism at any time. Therefore, the fault injection test can be partially executed at the time of normal operation of the semiconductor device 1.

As described above, in the semiconductor device 1 according to the first embodiment, the error signal outputted from the fault injection function 110 (error injection function) is inputted to the safety mechanisms 12, 22, 32, and 42 (failure detection mechanism) of the plurality of hierarchical modules 10, 20, 30, and 40, respectively, via the status register 120. As a result, failures of a plurality of safety mechanisms can be tested collectively, so that fault injection test can be performed on a plurality of safety mechanisms in a short time. Therefore, the fault injection test can be executed within a required period of time.

Further, the error control module 100 according to the first embodiment receives the error notification signal outputted from the safety mechanism in response to the fault injection signal (error signal). Then, the error control module 100 detects a failure of the safety mechanism in response to comparison of the error notification signal outputted from the safety mechanism with the error signal. As a result, it is possible to appropriately detect a failure of the safety mechanism including a failure of the error notification path Rn, such as a disconnection. Therefore, there is a high possibility that the ASIL-D which has cleared the problem of the inactive pathway will be certified.

When error signal is inputted from the fault injection function 110, the status register 120 according to first embodiment records data (first data) corresponding to error signal. The status register 120 resets the first data when a failure of the safety mechanism is detected. Thus, by accessing the status register 120, it is possible to easily confirm which safety mechanism has failed.

Figure 13:
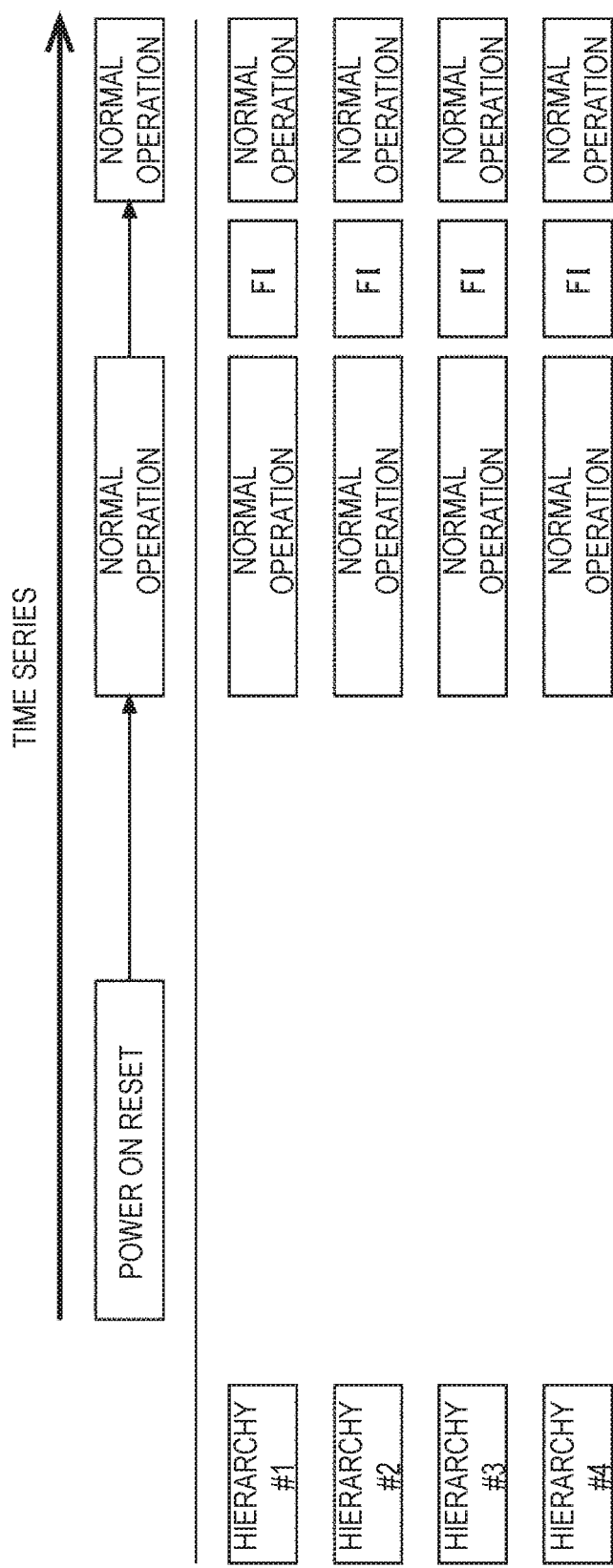
FIG. 13 is a timing chart showing the first example of the fault injection test of the first embodiment.

FIG. 13 is a timing chart showing a first example of the fault injection test according to the first embodiment. In the first instance, the fault injection test is executed at any time in the normal operation. As shown in FIG. 13, after the power-on reset, the hierarchical modules 10, 20, 30, and 40 perform normal operation. The semiconductor device 1 (timer 2) then interrupts the fault injection test at any time during the normal operation. As a result, the treatment described above with reference to FIGS. 10 to 12 is executed ("FI" in FIG. 13). When the fault injection test is completed, the hierarchical modules 10, 20, 30, and 40 perform normal operation again.

Although FIG. 13 shows an example in which all the hierarchical modules perform fault injection test at the same time, the present invention is not limited to such an example. For any safety mechanism of any of the hierarchical modules, fault injection test may be performed independently at any time and independently.

In this way, the semiconductor device 1 on the present embodiment can check whether or not the safety mechanism has failed at any time during the normal operation. In addition, since the presence or absence of a failure of the safety mechanism is confirmed at any time during the normal operation, it is possible to confirm whether or not an aging failure has occurred in the safety mechanism.

Figure 14:
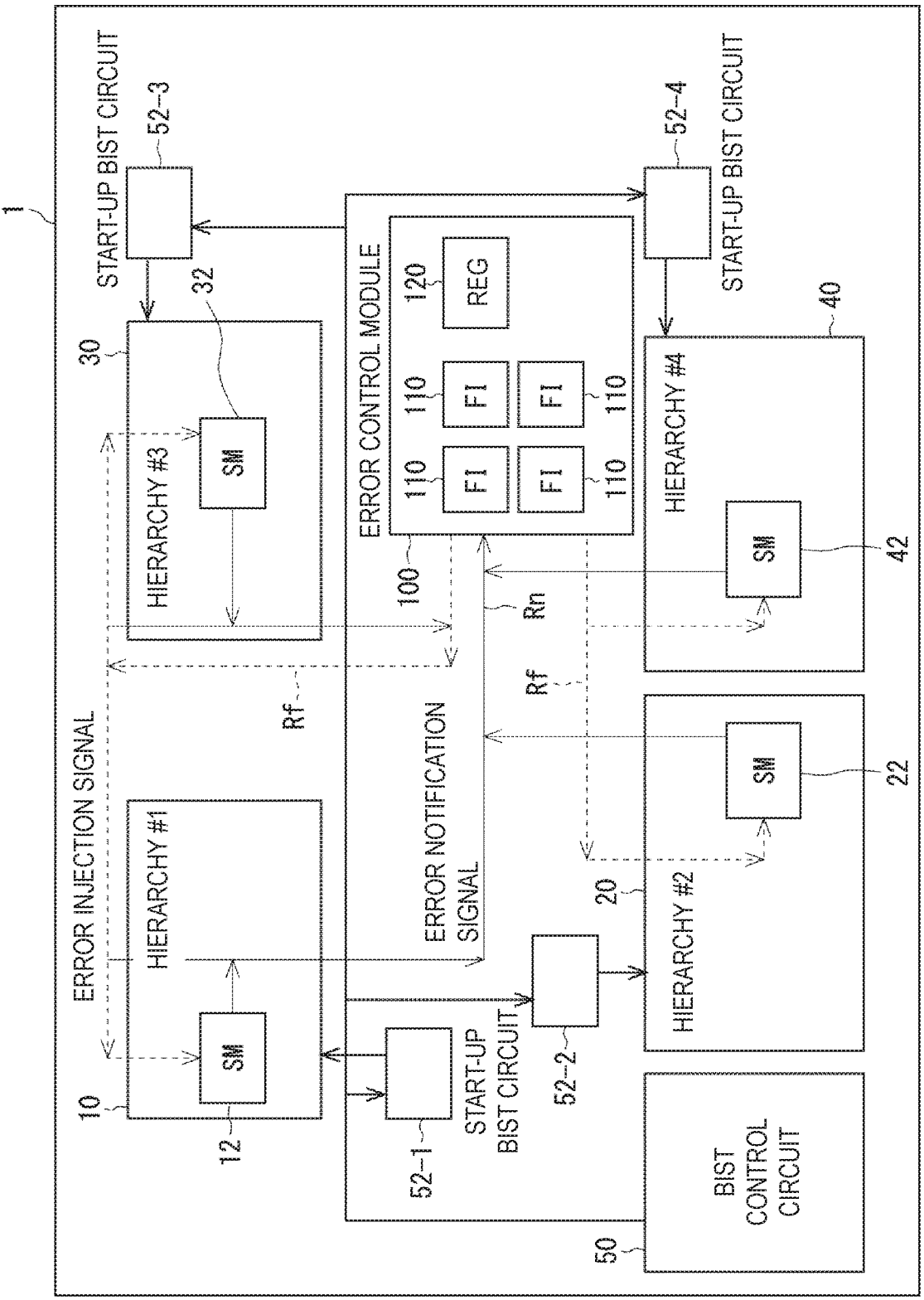
FIG. 14 is a diagram showing the configuration of a semiconductor device for realizing a second example of the fault injection test involved in the first embodiment.
Figure 15:
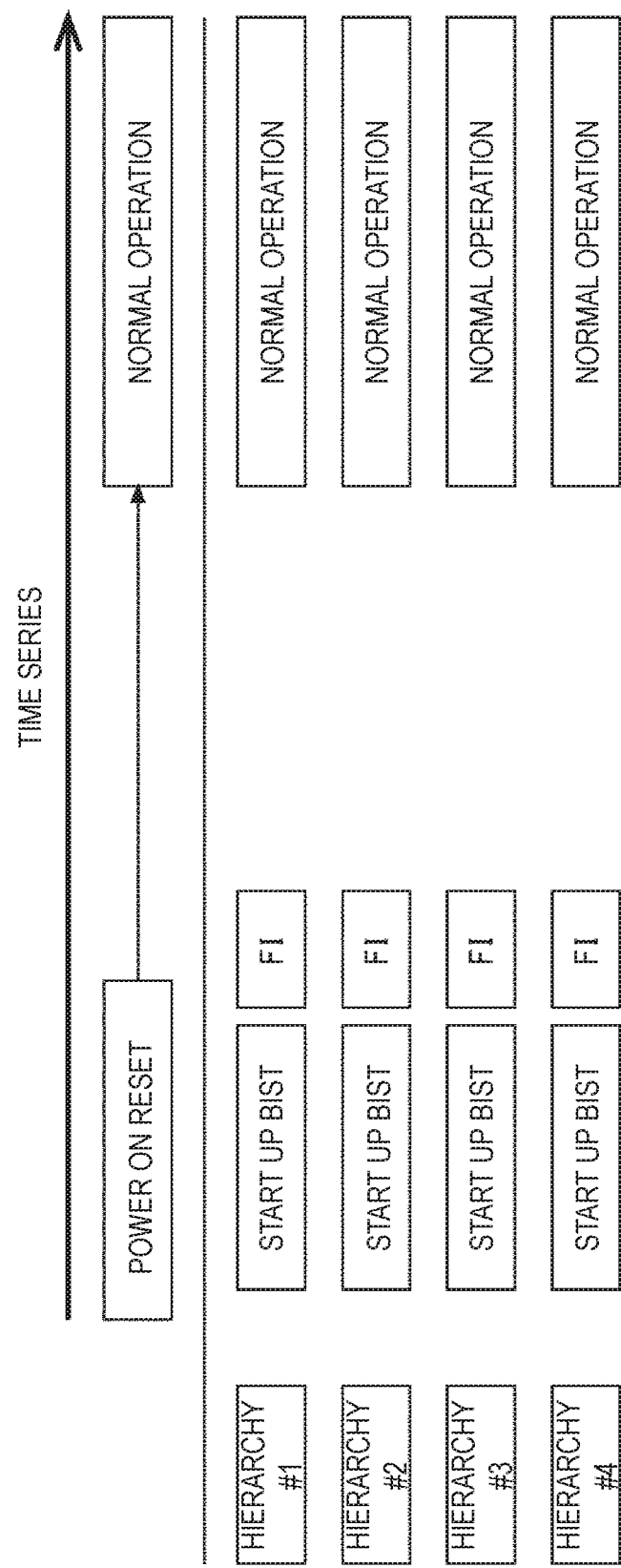
FIG. 15 is a timing chart showing the second example of the fault injection test of the first embodiment.

FIG. 14 is a diagram showing a configuration of the semiconductor device 1 for realizing the second example of the fault injection test according to the first embodiment. FIG. 15 is a timing chart showing a second example of the fault injection test according to the first embodiment. In the second example, after start-up BIST, the fault injection test is executed.

As shown in FIG. 14, the semiconductor device 1 includes a BIST control circuit 50 and start-up BIST circuits 52-1, 52-2, 52-3, and 52-4 in addition to the configuration shown in FIG. 1. The BIST control circuit 50 controls the initiation of the BIST when the semiconductor device 1 is powered on. The start-up BIST circuits 52-1, 52-2, 52-3, and 52-4 execute BIST on the hierarchical modules 10, 20, 30, and 40, respectively, upon activation of the hierarchical modules 10, 20, 30, and 40 under the control of the BIST control circuit 50.

As shown in FIG. 15, the semiconductor device 1 executes start-up BIST for the hierarchical modules 10, 20, 30, and 40 at the time of power-on reset. As a result, the semiconductor device confirms that the safety mechanisms of the respective hierarchical modules operate normally. Next, when the start-up BIST is completed, the BIST control circuit 50 of the semiconductor device 1 generates a hardware-based fault injection start signal. As a result, the treatment described above with reference to FIGS. 10 to 12 is executed ("FI" in FIG. 15). When the fault injection test is completed, the hierarchical modules 10, 20, 30, and 40 perform normal operation.

In this way, the semiconductor device 1 on the present embodiment can execute the fault injection test to the safety mechanism immediately after the start-up BIST. As a result, it is possible to confirm the presence or absence of a failure of the safety mechanism by the start-up BIST, and further to confirm the presence or absence of a failure of the error notification signal transmission path (error notification path Rn) of the safety mechanism. Furthermore, the fault injection test can be executed in a short time after the start-up BIST is finished.

Figure 16:
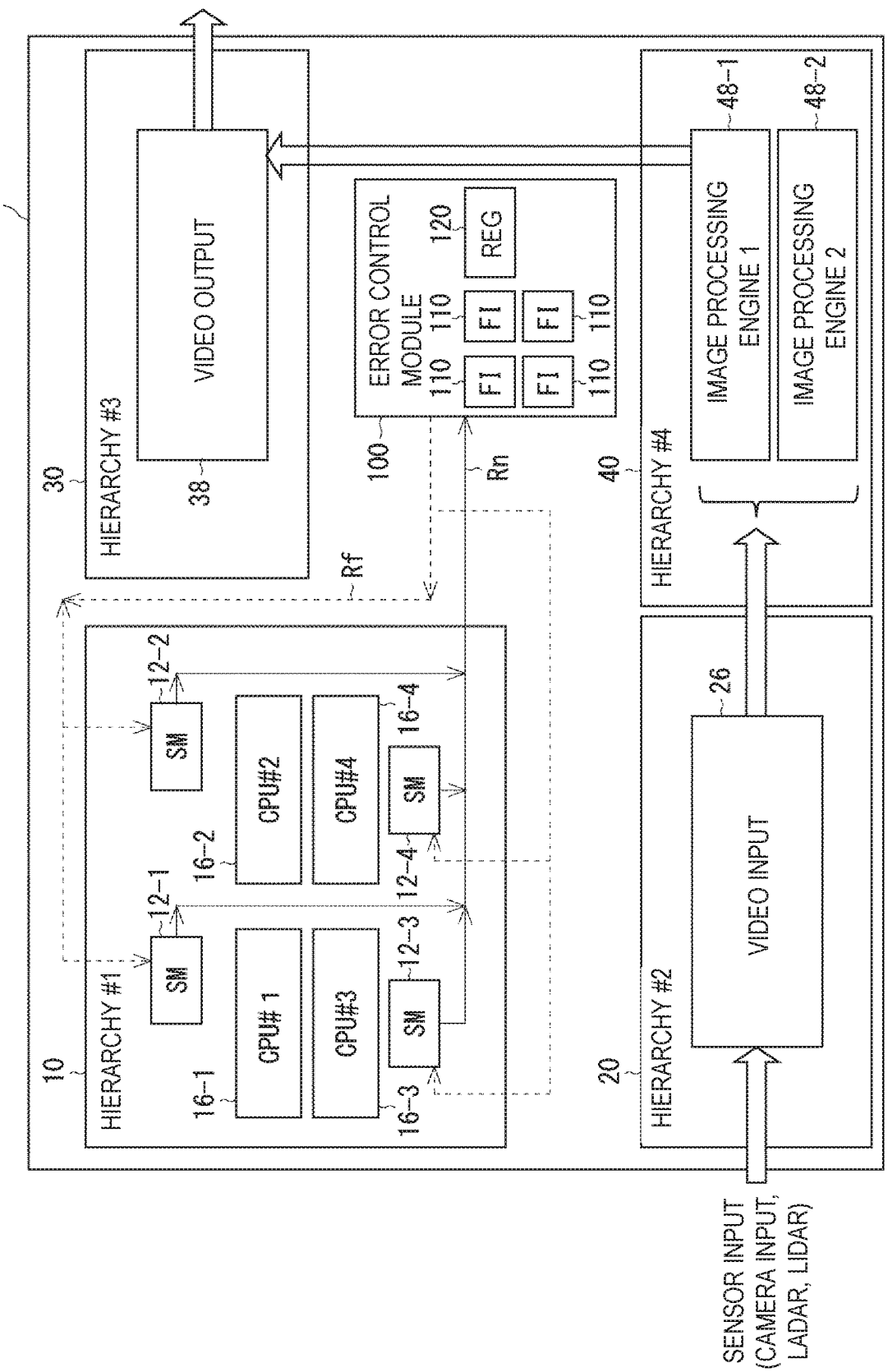
FIG. 16 is a diagram showing the configuration of the semiconductor device for realizing a third example of the fault injection test of the first embodiment.
Figure 17:
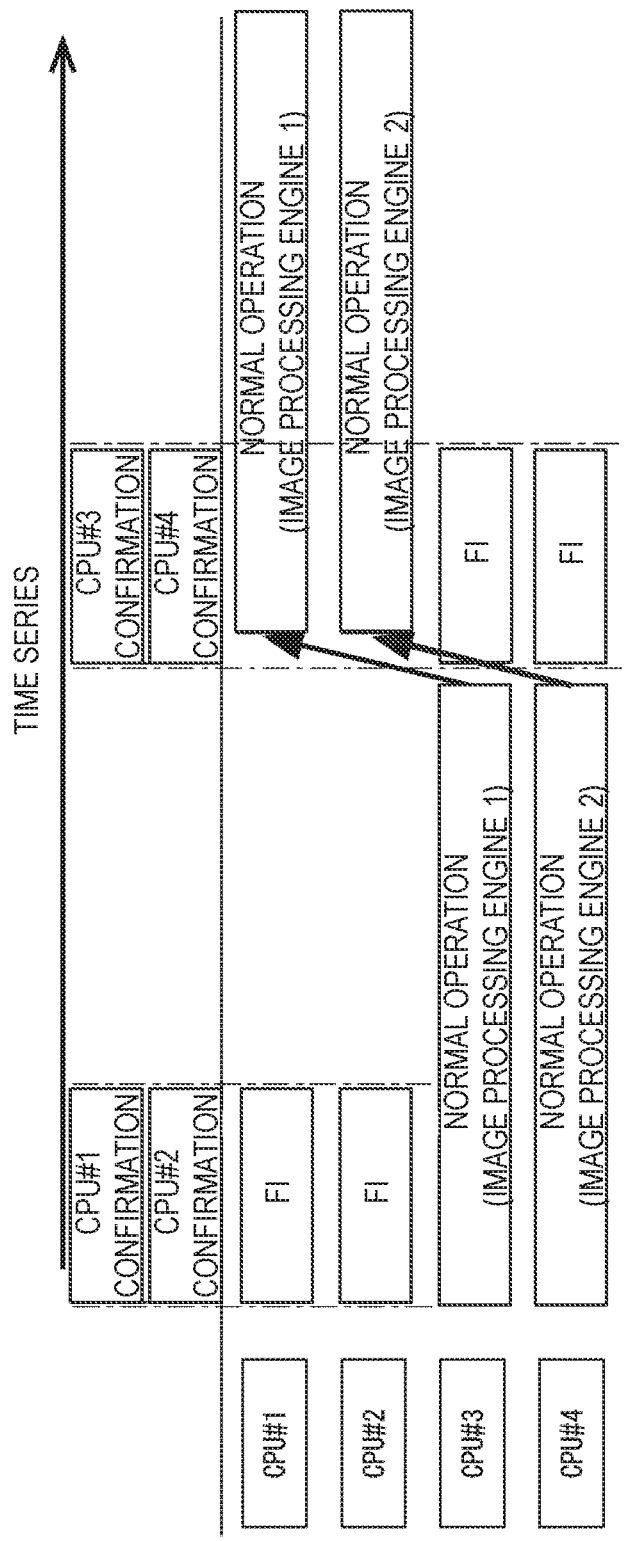
FIG. 17 is a timing chart showing the third example of the fault injection test of the first embodiment.

FIG. 16 is a diagram showing a configuration of the semiconductor device 1 for realizing the third example of the fault injection test according to the first embodiment. FIG. 17 is a timing chart showing the third example of the fault injection test according to the first embodiment. In the third example, a multi-CPU is configured. Then, at certain timings, fault injection test is executed for only a part of the CPUs, and fault injection test is not executed for the remaining CPUs.

As shown in FIG. 16, the hierarchical modules 10 of the semiconductor device 1 include safety mechanisms 12-1, 12-2, 12-3, and 12-4, and CPU 16-1, 16-2, 16-3, and 16-4. CPU 16-1, 16-2, 16-3, and 16-4 are components constituting the hierarchical module 10. Safety mechanisms 12-1, 12-2, 12-3, and 12-4 detect failures of CPU 16-1, 16-2, 16-3, and 16-4, respectively.

The hierarchical module 20 includes a video input 26 which is a component constituting the hierarchical module 20. The hierarchical module 30 has a video output 38 that constitutes the hierarchical module 30. The hierarchical module 40 has image processing engines 48-1 and 48-2 constituting the hierarchical module 40.

The CPU 16-1 executes the image processing engine 48-1. The CPU 16-2 executes image processing engine 48-2. The CPU 16-3 executes the image processing engine 48-1 when the CPU 16-1 is not executing the image processing engine 48-1. The CPU 16-4 executes image processing engine 48-2 when the CPU 16-2 is not executing image processing engine 48-2. Here, CPU 16-1 (CPU 16-3) and CPU 16-2 (CPU 16-4) execute the image processing engine 48-1 and the image processing engine 48-2, respectively, and perform the image processing duplicated by the software lock step.

As shown in FIG. 17, the semiconductor device 1 executes fault injection test on the safety mechanisms 12-1 and 12-2 for checking the failure of the CPU 16-1 and 16-2 ("CPU #1 confirmation" and "CPU #2 confirmation" in FIG. 17). At this time, CPU 16-1 and 16-2 cannot perform normal operation. Therefore, the CPU 16-3 executes the image processing engine 48-1, and the CPU 16-4 executes the image processing engine 48-2.

After executing the fault injection test to the safety mechanisms 12-1 and 12-2, at any time, the semiconductor device 1 executes the fault injection test to the safety mechanisms 12-3 and 12-4 for checking the failure of the CPU 16-3 and 16-4 ("CPU #3 confirmation" and "CPU #4 confirmation" in FIG. 17). At this time, CPU 16-3 and 16-4 cannot perform normal operation. Therefore, the CPU 16-1 executes the image processing engine 48-1, and the CPU 16-2 executes the image processing engine 48-2. That is, the semiconductor device 1 switches the executing entity of the image processing engine 48-1 from CPU 16-3 to CPU 16-1. Similarly, the semiconductor device 1 switches the executing entity of the image processing engine 48-2 from CPU 16-4 to CPU 16-2. The semiconductor device 1 alternately repeats the switching of the executing entity.

For example, when the semiconductor device 1 shown in FIG. 16 is applied to an automated driving technique, image data is continuously outputted from a sensor, so that image processing by a CPU 16 (executing the image processing engine 48) cannot be stopped. In the auto-operation art, it is desired to execute the fault injection test at any time during the normal operation. On the other hand, the semiconductor device 1 according to the present embodiment can execute fault injection test on the safety mechanism 12 corresponding to another CPU 16 (second processor) even when any CPU 16 (first processor) of the plurality of CPU performs normal operation. Therefore, the semiconductor device 1 according to the present embodiment can execute the fault injection test at any time during the normal operation without stopping the treatment such as the image processing by the CPU.

Figure 18:
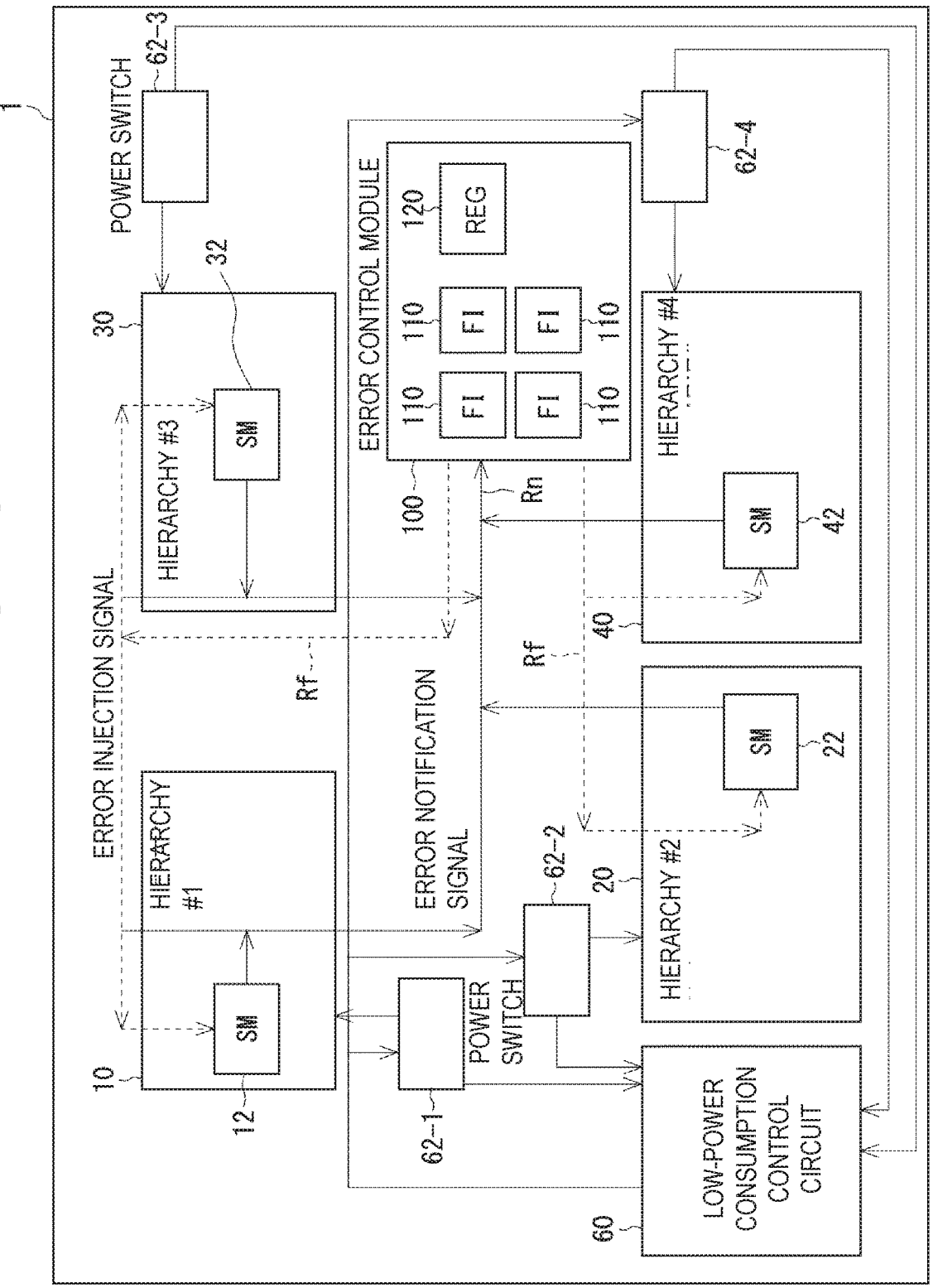
FIG. 18 is a diagram showing the configuration of a semiconductor device for realizing a fourth example of the fault injection test of the first embodiment.

FIG. 18 is a diagram showing a configuration of the semiconductor device 1 for realizing the fourth example of the fault injection test according to the first embodiment. In the fourth example, when the power supply is separated for each hierarchical module, the fault injection test is executed when the power supply of each hierarchical module is turned on.

As shown in FIG. 18, the semiconductor device 1 includes a low-power consumption control circuit 60 and power switches 62-1, 62-2, 62-3, and 62-4 in addition to the configuration shown in FIG. 1. The low-power consumption control circuit 60 controls the power switches 62-1, 62-2, 62-3, and 62-4 to control the power supply of the hierarchical modules 10, 20, 30, and 40. That is, the low-power consumption control circuit 60 can select which of the hierarchical modules 10, 20, 30, and 40 is supplied with power and which is not supplied with power. The power switches 62-1, 62-2, 62-3, and 62-4 control whether to supply power to the hierarchical modules 10, 20, 30, and 40, respectively, or to shut off the power supplied thereto.

When designing a semiconductor device hierarchy, a hierarchy may be divided by arranging functionally related components in the same hierarchy while considering the size of circuits. In such cases, the low-power consumption control circuit 60 and the power switch 62 may be used to shut off the power of only the hierarchies that are not currently used during the operation of the semiconductor device, thereby reducing the power consumed by the semiconductor device. When a component in the hierarchical module needs to be used, for example, the CPU writes data to a control register (not shown) built in the low-power consumption control circuit 60 from the CPU, thereby setting the hierarchical module to be supplied with power. The low-power consumption control circuit 60 turns on the power switch 62 for the hierarchical modules based on the setting. When the power supply is stabilized, the power switch 62 transmits information indicating that the power supply is stabilized to the low-power consumption control circuit 60. The low-power consumption control circuit 60 can manage the power status of the hierarchical modules based on the information from the power switch 62.

In such a semiconductor device 1, it is also useful in viewpoint of functional safety to check the operation of the safety mechanism for the same purposes as in the fault injection test immediately after the start-up BIST (FIG. 15) after the power is supplied until the components in the hierarchical module starts operating. In this instance, for example, the information indicating that the power supply is stable is transmitted from the power switch 62 to the low-power consumption control circuit 60. Based on the information, the low-power consumption control circuit 60 can output a signal connected to the Fault_injection_enb to the error control module 100 so as to apply the fault injection test to the hierarchical module. In addition, as described above, after writing to the control register incorporated in the low-power consumption control circuit 60 to instruct the power ON, the CPU can read status register (not shown) indicating the power states of the respective hierarchical modules, and after confirming the power ON, the CPU can output Fault_injection_enb signals to the hierarchical modules in the software. As described above, the semiconductor device 1 that performs the low-power-consumption control shown in FIG. 18 can timely and quickly test the safety mechanism during the period from the power supply to the start of the operation.

Next, second embodiment will be described. Second embodiment differs from first embodiment in that there is a plurality of semiconductor device 1 described above. Note that the configuration of the semiconductor device 1 is substantially the same as that described in the above-mentioned first embodiment, and therefore the explanation thereof is omitted.

Figure 19:
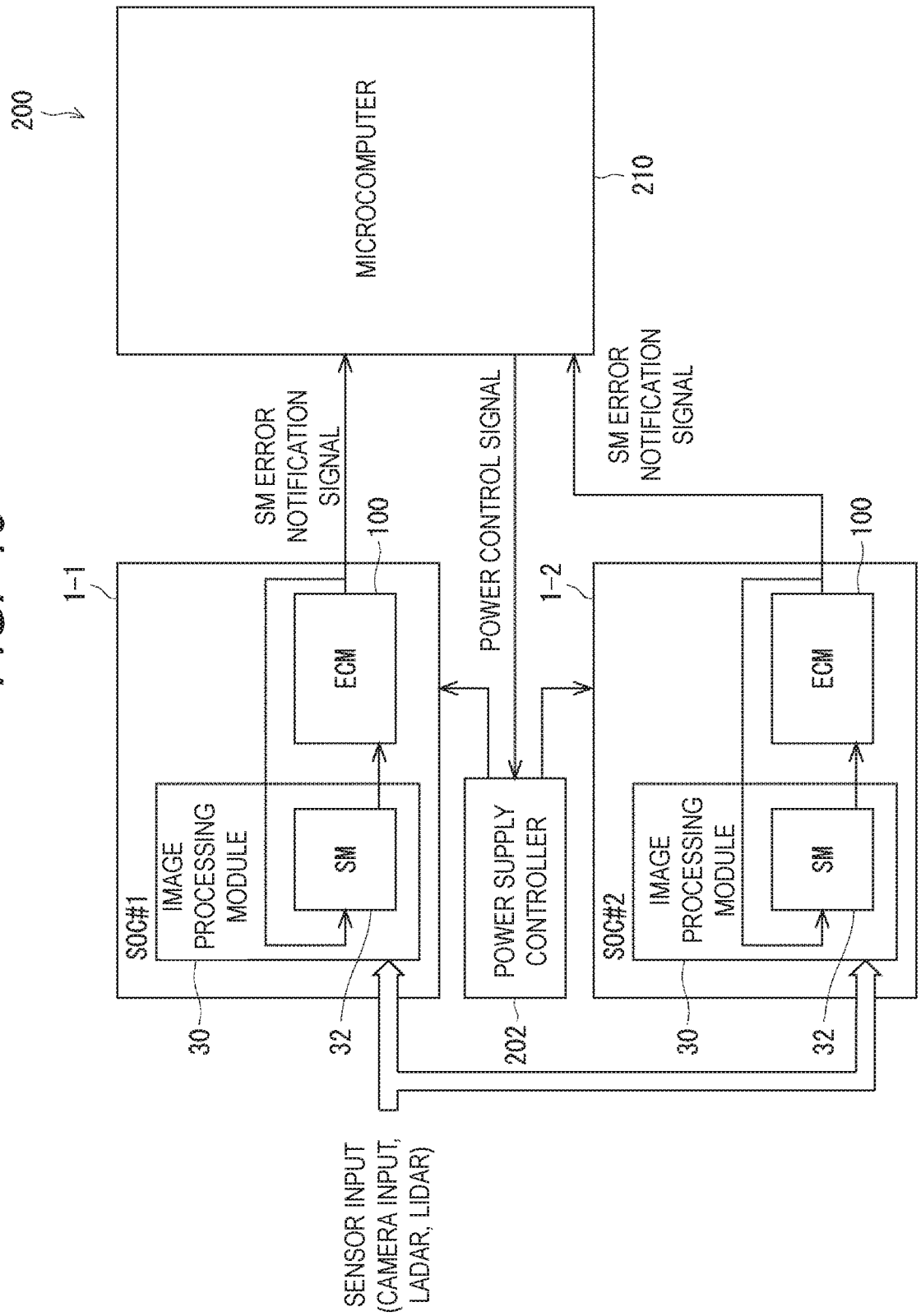
FIG. 19 is a diagram showing a configuration of a semiconductor system according to a second embodiment.

FIG. 19 is a diagram showing a configuration of a semiconductor system 200 according to the second embodiment. The semiconductor system 200 includes a plurality of semiconductor device systems 1-1 and 1-2, a power supply controller 202, and a microcomputer 210. The components of the semiconductor system 200 shown in FIG. 19 may be mounted on a single chip.

The semiconductor system 200 according to the second embodiment is preliminarily mounted with semiconductor device 1-2 (SOC #2) in addition to semiconductor device 1-1 (SOC #1) in preparation for stoppage of operation due to aging failure. The semiconductor system 200 according to the second embodiment realizes a duplexing treatment by such a multi-SOC system. For clarity of explanation, only the hierarchical module 30 (image processing module) is described as the hierarchical module in the semiconductor device 1 of FIG. 19. However, the semiconductor device 1-1 and 1-2 may have plurality of hierarchical modules, as shown in FIG. 1 and the like.

The microcomputer 210 monitors the semiconductor devices 1-1 and 1-2. The microcomputer 210 outputs power control signals to the power supply controller 202. Power supply controller 202 provides power to one of semiconductor devices 1-1 and 1-2, and controls to shut off the power supply to the other in response to power control signals from microcomputer 210. The microcomputer 210 may also receive the SM error notification signal from the semiconductor device 1-1 and 1-2, and notify the user of which component has failed based on the SM error notification signal. The notification to the user may be the same in the first embodiment.

Figure 20:
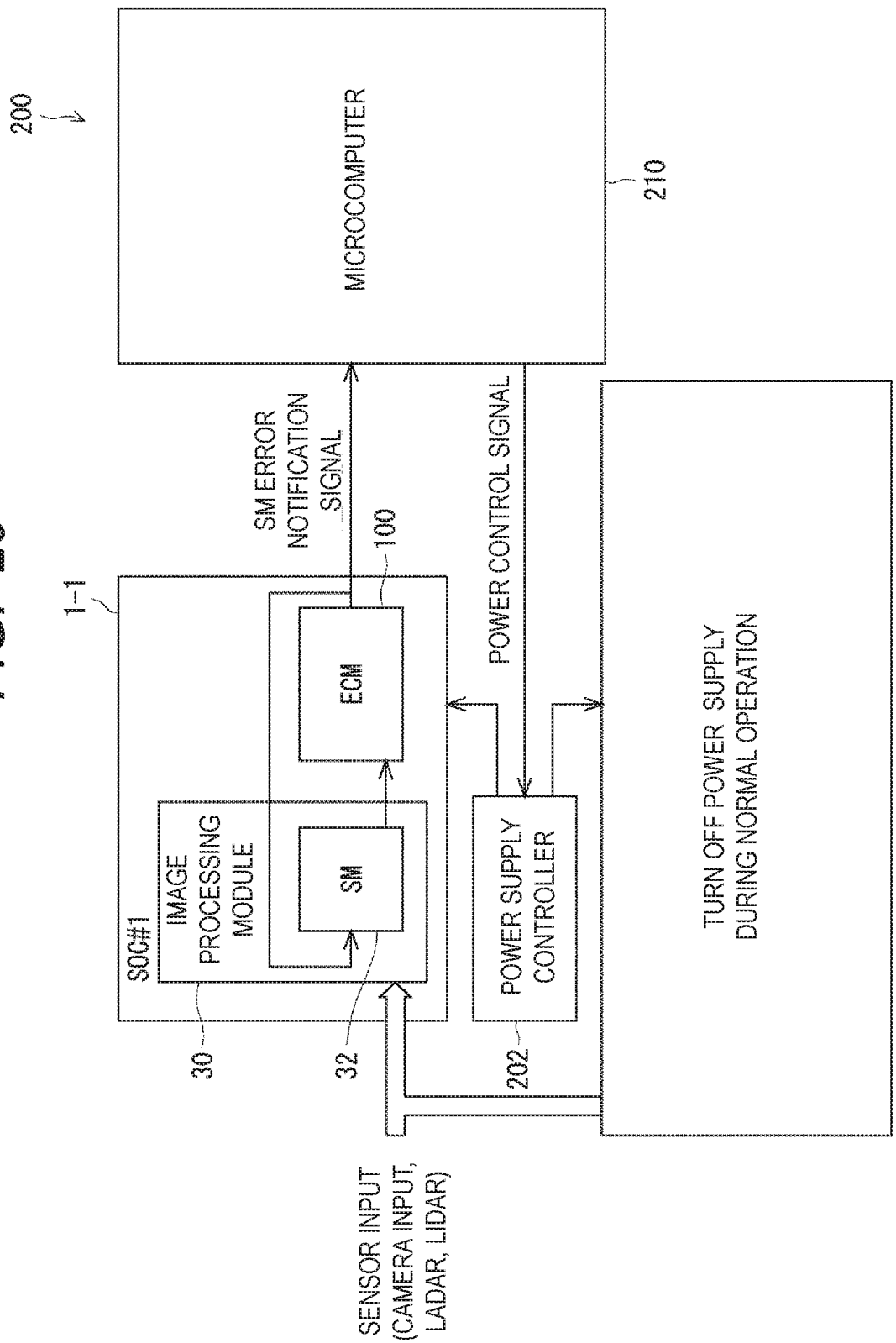
FIG. 20 is a diagram for explaining a semiconductor device switching process in the semiconductor system according to the second embodiment.
Figure 21:
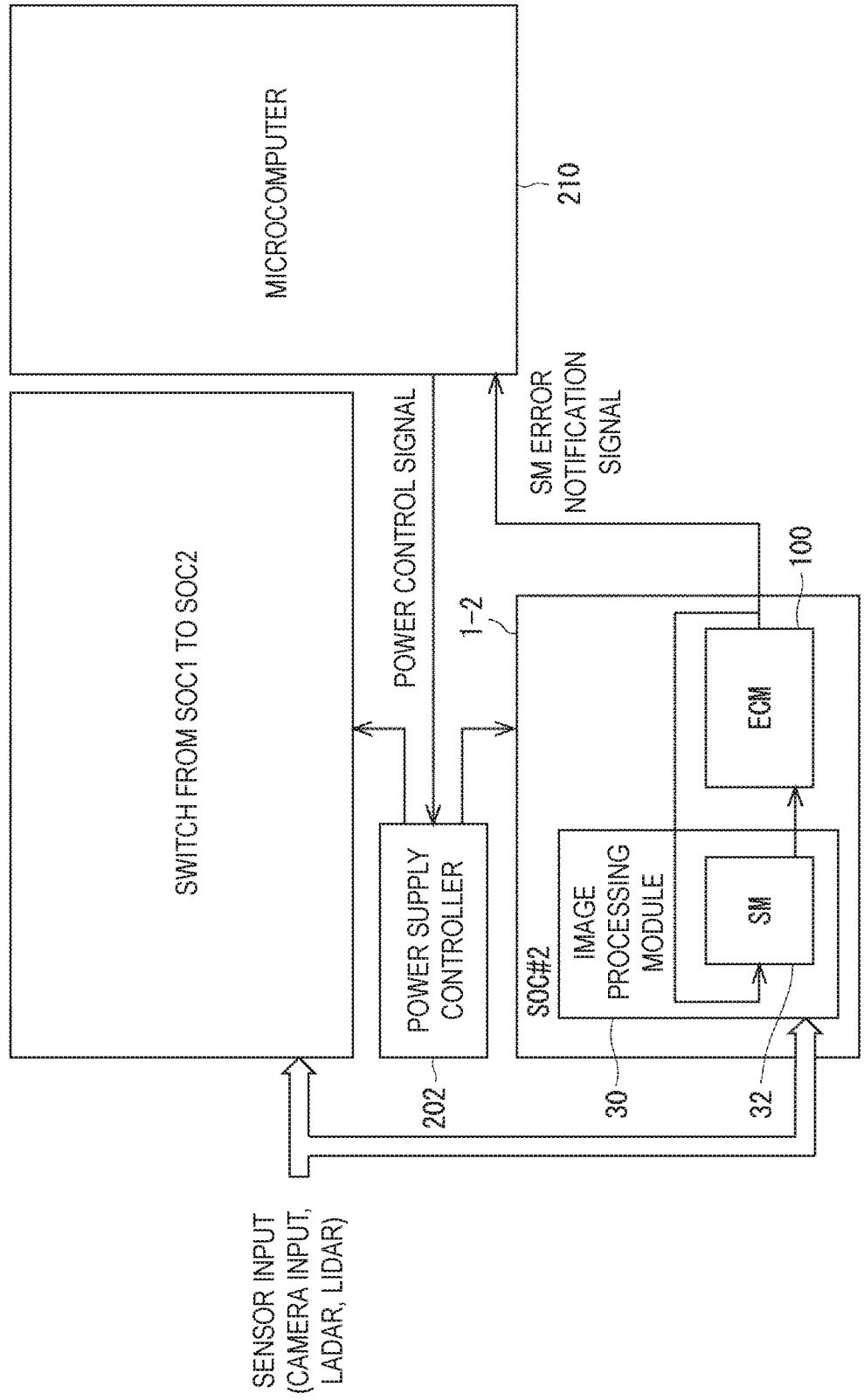
FIG. 21 is a diagram for explaining the semiconductor device switching process in the semiconductor system according to the second embodiment.
Figure 22:
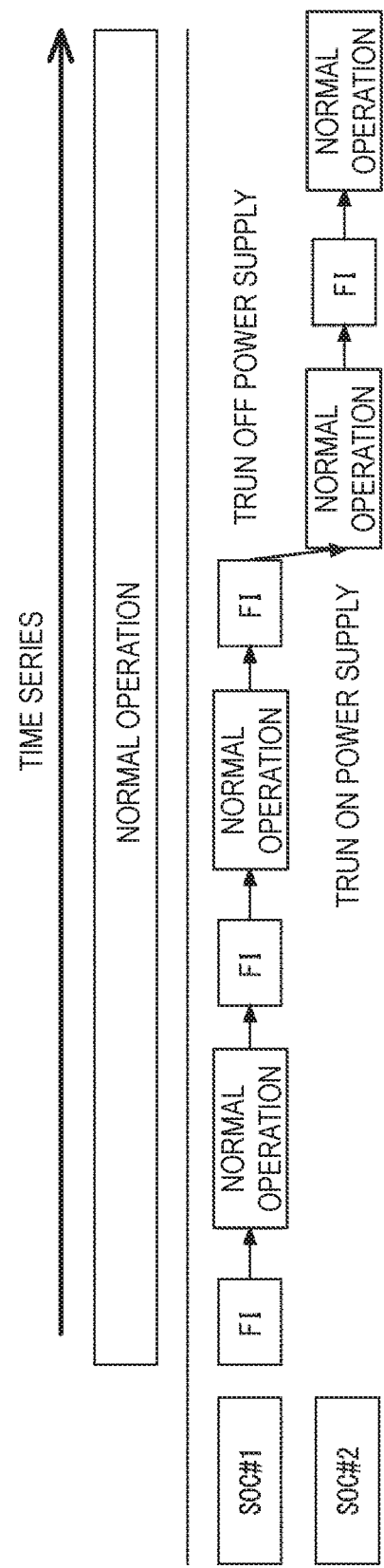
FIG. 22 is a timing chart of the semiconductor system for the second embodiment.

FIGS. 20 and 21 are diagrams for explaining the switching process of the semiconductor device 1 in the semiconductor system 200 according to the second embodiment. FIG. 22 is a timing chart of the semiconductor system 200 according to the second embodiment. In a normal state, as shown in FIG. 20, the power supply controller 202 supplies power to the semiconductor device 1-1 (SOC #1) and turns off the power of the semiconductor device 1-2 (SOC #2). As shown in FIG. 22, as described above in first embodiment, the semiconductor device 1-1 executes fault injection test at any time during normal operation.

Then, it is assumed that an error (failure of the safety mechanism) is detected in the fault injection test (the third FI in FIG. 22) of the semiconductor device 1-1 (SOC #1) at a certain time. In this instance, the microcomputer 210 may receive a notification signal indicating that the safety mechanism of semiconductor device 1-1 has failed. The microcomputer 210 outputs power supply control signals indicating that the power supply is switched from semiconductor device 1-1 to semiconductor device 1-2 to the power supply controller 202. As a result, as shown in FIG. 22, the power supply controller 202 turns off the power of the semiconductor device 1-1 (SOC #1) and turns on the power of the semiconductor device 1-2 (SOC #2). Then, the semiconductor device 1-2 executes fault injection test at any time in the normal operation.

As described above, in the semiconductor system 200 according to the second embodiment, the microcomputer 210 controls the semiconductor device 1-1 (first semiconductor device) of the plurality of semiconductor device to perform normal operation. Then, the microcomputer 210 stops the operation of the semiconductor device 1-1 and switches the operation of the semiconductor device 1-2 (second semiconductor device) that differs from the operation of the semiconductor device 1-1 when the failure of the safety mechanism is detected for the semiconductor device 1-1. Thus, even if one semiconductor device 1 fails, the normal operation can be continued. This also ensures the safety of the automatic operation art.

MODIFIED EXAMPLE

The present embodiment is not limited to the above embodiment, and can be appropriately changed within a scope not deviating from the gist. For example, the semiconductor device 1 according to the present embodiment is not limited to being applied to an automation technique. The present invention is applicable to any technique requiring high reliability, such as a semiconductor device having a safety mechanism for checking failures of components.

In the embodiment described above, the fault injection function 110 is provided corresponding to each safety mechanism, but the present invention is not limited to such a configuration. One fault injection function 110 may output a fault injection signal to be transmitted to a plurality of safety mechanisms. However, as described above, by configuring the fault injection function 110 so as to correspond to each safety mechanism, it is possible to test any safety mechanism at any timing.

Although the invention made by the inventor has been specifically described based on the embodiment, the present invention is not limited to the embodiment already described, and it is needless to say that various modifications can be made without departing from the gist thereof.

What is claimed is:
1. A semiconductor device comprising:
a plurality of hierarchical modules; and
an error control module configured to perform control regarding an error in the plurality of hierarchical modules;
each of the hierarchical modules having at least one failure detection mechanism configured to detect a failure of each of the hierarchical modules,
wherein the error control module comprising:
a status register configured to record data indicating a status of the failure of each of hierarchical modules; and
at least one error injection function configured to output an error signal to perform a fault injection test on the status register,
wherein the error signal output from the at least one error injection function is output to the failure detection mechanism of each of the hierarchical modules via the status register.

2. The semiconductor device according to claim 1,
wherein the hierarchical modules are divided and hierarchized by function, and
wherein the error control module receives an error notification signal output from the fault detection mechanism in response to input of the error signal, and detects a fault in the fault detection mechanism in response to comparison of the error notification signal output from the fault detection mechanism with the error signal.

3. The semiconductor device according to claim 2, wherein the status register records a first data corresponding to the error signal when the error signal is inputted from the error injecting function, and resets the first data when a failure of the failure detection mechanism is detected.

4. The semiconductor device according to claim 1, wherein an error injection function is provided corresponding to the at least one failure detection mechanism of each of the hierarchical modules, and error signals outputted from the error injection function are inputted to the failure detection mechanisms of each of the hierarchical modules independently each other.

5. The semiconductor device according to claim 1, wherein the error injection function outputs the error signal when one of the hierarchical modules is activated.

6. The semiconductor device according to claim 1, wherein each of the hierarchical modules further includes a signal monitor circuit that monitors the error signal inputted to said failure detector.

7. The semiconductor device according to claim 1, wherein when the fault detection mechanism is operating normally, the status register records a second data indicating an error state of the function for which the fault detection mechanism is subject to fault detection.

8. The semiconductor device according to claim 7, wherein the error control module further comprising a selection circuit configured to output the error signal output from the error injection function to the status register when the fault injection test is performed, and to output the second data to the status register when the fault injection test is not performed.

9. The semiconductor device according to claim 1, wherein the status register records data indicating a status of a fault for a plurality of fault detection mechanisms.

10. The semiconductor device according to claim 1,
wherein one of the plurality of hierarchical modules has a plurality of processors,
wherein the at least one failure detection mechanism is provided for each of the plurality of processors, and
wherein when at least one first processor of the plurality of processors is performing a normal operation, the error control module performs a fault injection test for the failure detection mechanism corresponding to a second processor other than the first processor of the plurality of processors.

11. A semiconductor system including a plurality of semiconductor devices according to claim 1 further comprising a controller configured to monitor the plurality of semiconductor devices, wherein the controller controls a first semiconductor device of the plurality of semiconductor devices to perform normal operation, stops the normal operation of the first semiconductor device when a failure of the failure detection mechanism is detected for the first semiconductor device, and switches to operate a second semiconductor device of the plurality of semiconductor device that differs from the first semiconductor device.

12. A test method of a semiconductor device comprising:
outputting an error signal for performing a fault injection test on a status register configured to record data indicative of a status of a failure of each hierarchical module of a plurality of hierarchical modules divided and hierarchized by function, and outputting the error signal via the status register to at least one fault detection mechanism configured to detect a failure of a function of a component configuring each of the hierarchical modules.

13. The test method according to claim 12, wherein the failure of the failure detection mechanism is detected in response to a comparison of an error notification signal output from the failure detection mechanism with the error signal in response to an input of the error signal.

14. The test method according to claim 13, wherein the status register records first data corresponding to the error signal when the error signal is input, and resets the first data when a failure of the failure detection mechanism is detected.

15. The test method according to claim 12, wherein the error signal is input to the fault detection mechanism of each of the hierarchical modules independently each other.

16. The test method according to claim 12, wherein the error signal is output when one of the hierarchical modules is activated.

* * * * *